(12) United States Patent
Yoshino et al.

(10) Patent No.: US 9,872,013 B2
(45) Date of Patent: Jan. 16, 2018

(54) STEREOSCOPIC DISPLAY DEVICE

(71) Applicant: Sharp Kabushiki Kaisha, Osaka-shi, Osaka (JP)

(72) Inventors: Takuto Yoshino, Osaka (JP); Takehiro Murao, Osaka (JP); Hiroshi Fukushima, Osaka (JP); Ryoh Kikuchi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 130 days.

(21) Appl. No.: 15/031,304

(22) PCT Filed: Aug. 28, 2014

(86) PCT No.: PCT/JP2014/072606
§ 371 (c)(1),
(2) Date: Apr. 22, 2016

(87) PCT Pub. No.: WO2015/060011
PCT Pub. Date: Apr. 30, 2015

(65) Prior Publication Data
US 2016/0286206 A1    Sep. 29, 2016

(30) Foreign Application Priority Data
Oct. 25, 2013   (JP) .................................. 2013-222773

(51) Int. Cl.
*H04N 15/00*    (2006.01)
*H04N 13/04*    (2006.01)
(Continued)

(52) U.S. Cl.
CPC ..... *H04N 13/0425* (2013.01); *G02B 27/2214* (2013.01); *G02F 1/137* (2013.01);
(Continued)

(58) Field of Classification Search
CPC ........... H04N 13/0425; H04N 13/0409; H04N 13/0468; H04N 2213/001;
(Continued)

(56) References Cited

U.S. PATENT DOCUMENTS

| 5,777,720 | A | 7/1998 | Shapiro et al. |
| 9,784,982 | B2* | 10/2017 | Murao ............... G02B 27/2214 |
| 2006/0209407 | A1* | 9/2006 | Hamagishi ........... G02B 27/225 |
| | | | 359/465 |

FOREIGN PATENT DOCUMENTS

JP          09-149433 A       6/1997

* cited by examiner

*Primary Examiner* — Robert Chevalier
(74) *Attorney, Agent, or Firm* — Keating & Bennett, LLP

(57) ABSTRACT

Obtained is a configuration of a stereoscopic display device that allows a viewer to easily correct settings for stereoscopic display. A stereoscopic display device (1) includes: a display panel (10) for displaying an image; a switch liquid crystal panel (20) that is arranged so as to be stacked on the display panel (10); a position sensor for acquiring position information of a viewer; and a control unit for causing the switch liquid crystal panel (20) to display a parallax barrier in which transmitting regions and non-transmitting regions are formed in periodic fashion in a predetermined alignment direction. The control unit has, as operation modes, at least a tracking mode in which, according to the position information, the parallax barrier is moved in the alignment direction and is displayed on the switch liquid crystal panel (20), and a calibration mode for calibration of a reference position of the position information. The control unit sets a width of the transmitting region of the parallax barrier in the tracking mode, and a width of the transmitting region of the parallax barrier in the calibration mode, so that the widths are different from each other.

9 Claims, 21 Drawing Sheets

(51) Int. Cl.

| | |
|---|---|
| *G09G 3/00* | (2006.01) |
| *G02B 27/22* | (2006.01) |
| *G02F 1/1333* | (2006.01) |
| *G02F 1/1335* | (2006.01) |
| *G02F 1/1337* | (2006.01) |
| *G02F 1/1368* | (2006.01) |
| *G02F 1/137* | (2006.01) |
| *G02F 1/29* | (2006.01) |
| *G02F 1/1343* | (2006.01) |

(52) U.S. Cl.
CPC ........ *G02F 1/1368* (2013.01); *G02F 1/13338* (2013.01); *G02F 1/133345* (2013.01); *G02F 1/133514* (2013.01); *G02F 1/133528* (2013.01); *G02F 1/133784* (2013.01); *G02F 1/292* (2013.01); *G09G 3/003* (2013.01); *H04N 13/0409* (2013.01); *H04N 13/0468* (2013.01); *G02F 1/134309* (2013.01); *G09G 2300/023* (2013.01); *H04N 2213/001* (2013.01)

(58) Field of Classification Search
CPC ......... G02F 1/134309; G02F 1/133345; G02F 1/133514; G02F 1/1368; G02F 1/133528; G02F 1/133784; G02F 1/292; G02F 1/137; G02F 1/13338; G02B 27/2214
USPC ............... 348/42, 46, 48, 49, 51, 52, 54, 58; 386/223, 227
See application file for complete search history.

STEREOSCOPIC DISPLAY DEVICE

TECHNICAL FIELD

The present invention relates to a naked-eye stereoscopic display device.

BACKGROUND ART

As a stereoscopic display device that can be viewed with naked eyes, those of a parallax barrier type and a lenticular lens type are known. The stereoscopic display devices of these types separate light using barriers or lenses, and cause different images to be visible to the right and left eyes, respectively, so as to provide a stereoscopic vision to the viewer. In recent years, main types of naked-eye stereoscopic display devices that are in the market are those of the two-viewpoint parallax barrier type and those of the lenticular lens type.

In the case of such a two-viewpoint stereoscopic display device, excellent stereoscopic display can be achieved from a predetermined region, but there also exists the following region: when a viewer moves the head to the region, a so-called crosstalk occurs, which is such a phenomenon that an image to be visible to the right eye and an image to be visible to the left eye are mixed and viewed as a double image, or a state of a so-called pseudoscopic vision occurs, which is such a phenomenon that an image to be visible to the right eye is visible to the left eye. Therefore, only from a limited region, a viewer can view stereoscopic images. To address this problem, the multiple-viewpoint technique, the tracking technique of detecting the position of the head of a viewer and displaying an image according to the position and the like have been proposed.

Further, a technique of a switch liquid crystal display (SW-LCD) of a barrier division type has been proposed, wherein a parallax barrier is formed with a liquid crystal panel and is moved according to the position of a viewer.

In a case of the SW-LCD technique, with installation deviation of the camera (position sensor), alignment deviation between the display panel and the switch liquid crystal panel, or the like, the parallax barrier cannot be displayed at an accurate position with respect to the position of the viewer. In the case of the SW-LCD technique, therefore, it is necessary to correct such deviation by calibration.

JP-A-H9-149433 discloses a method of calibrating a viewer following display that includes a following system that follows the position of a viewer, and a controller that controls the direction of a viewing zone in accordance with the following system, the viewer following display forming a viewing zone that can be operated. The method includes the step of operating the viewing zone in a plurality of directions one by one, the step of confirming an optimal viewing position with respect to each of the directions, the step of deciding the respective optimal viewing positions by the following system, and the step of associating the decided optimal viewing positions with the corresponding directions, respectively, by the controller.

DISCLOSURE OF THE INVENTION

It is difficult for a viewer who is not familiar to a stereoscopic display device to determine an optimal position, simply based on the intensity of light projected to the right and left eyes or the minimized crosstalk as is the case with the method disclosed in JP-A-H9-149433.

It is an object of the present invention to obtain a configuration of a stereoscopic display device having settings for stereoscopic display that can be corrected easily by a viewer.

A stereoscopic display device disclosed herein includes: a display panel for displaying an image; a switch liquid crystal panel that is arranged so as to be stacked on the display panel; a position sensor for acquiring position information of a viewer; and a control unit for causing the switch liquid crystal panel to display a parallax barrier in which transmitting regions and non-transmitting regions are formed in periodic fashion in a predetermined alignment direction. The control unit has, as operation modes, at least a tracking mode in which, according to the position information, the parallax barrier is moved in the alignment direction and is displayed on the switch liquid crystal panel, and a calibration mode for calibration of a reference position of the position information, and the control unit sets a width of the transmitting region of the parallax barrier in the tracking mode, and a width of the transmitting region of the parallax barrier in the calibration mode, so that these widths are different from each other.

According to the present invention, a configuration of a stereoscopic display device having settings for stereoscopic display that can be easily corrected by a viewer.

MODE FOR CARRYING OUT THE INVENTION

Figure 1:
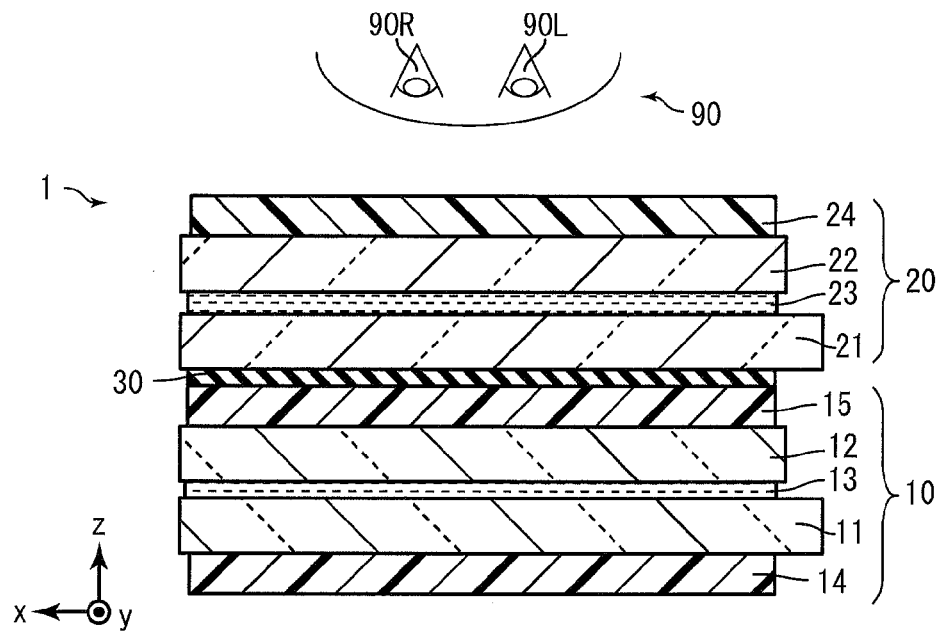
FIG. 1 is a schematic cross-sectional view illustrating a configuration of a stereoscopic display device according to Embodiment 1 of the present invention.

A stereoscopic display device according to one embodiment of the present invention includes: a display panel for displaying an image; a switch liquid crystal panel that is arranged so as to be stacked on the display panel; a position sensor for acquiring position information of a viewer; and a control unit for causing the switch liquid crystal panel to display a parallax barrier in which transmitting regions and non-transmitting regions are formed in periodic fashion in a predetermined alignment direction. The control unit has, as operation modes, at least a tracking mode in which, according to the position information, the parallax barrier is moved in the alignment direction and is displayed on the switch liquid crystal panel, and a calibration mode for calibration of a reference position of the position information, and the control unit sets a width of the transmitting region of the parallax barrier in the tracking mode, and a width of the transmitting region of the parallax barrier in the calibration mode, so that these widths are different from each other.

According to the above-described configuration, the switch liquid crystal panel is arranged so as to be stacked on the display panel. On the switch liquid crystal panel, a parallax barrier in which transmitting regions and non-transmitting region are formed in periodic fashion in the predetermined alignment direction is displayed. This makes it possible that, when a viewer views the stereoscopic display device at an appropriate position, an image on a part of the display panel is viewed by the right eye, and an image on the other part of the display panel is viewed by the left eye. This allows the viewer to have stereoscopic vision.

According to the above-described configuration, the control unit has at least the tracking mode and the calibration mode, as the display modes. In the tracking mode, according to position information of the viewer acquired by the position sensor, the control unit moves the parallax barrier in the alignment direction and causes the switch liquid crystal panel to display the parallax barrier. This makes it possible to maintain crosstalk at a low level.

The luminance characteristics and the crosstalk characteristics of the stereoscopic display device vary with the width of the transmitting region of the parallax barrier. The control unit sets the width of the transmitting region of the parallax barrier in the tracking mode, and the width of the transmitting region of the parallax barrier in the calibration mode, so that these widths are different from each other.

The control unit, for example, varies the width of the transmitting region in the calibration mode, so as to deteriorate the crosstalk characteristics as compared with the case of the tracking mode. In other words, the control unit makes such setting that when the viewing position is shifted, abruptly crosstalk deteriorates. Alternatively, the control unit varies the width of the transmitting region in the calibration mode, so as to deteriorate the luminance characteristics as compared with the case of the tracking mode. In other words, the control unit makes such setting that when the viewing position is shifted, abruptly the luminance changes. This allows the viewer to easily identify an appropriate viewing position (reference position).

The first configuration may further include an input device that receives an operation from the viewer, wherein the control unit includes a calibration processing unit that calibrates the reference position of the position information, based on the position information when a specific operation is performed with respect to the input device in the calibration mode (the second configuration).

The second configuration may be such that the control unit further includes a storage device, and the calibration processing unit causes the storage device to store the position information when the specific operation is performed with respect to the input device in the calibration mode, and calibrates the reference position based on two or more pieces of position information including the position information stored by the storage device (the third configuration).

Third configuration is preferably such that the calibration processing unit includes an averaging circuit that averages the two or more pieces of position information including the position information stored by the storage device (the fourth configuration).

According to the above-described configuration, two or more pieces of position information are averaged, and the reference position is calibrated based on the averaged position information. This makes it possible to improve the accuracy of correction.

Any one of the first to fourth configurations may be such that the control unit sets the width of the transmitting region of the parallax barrier in the calibration mode to a width greater than the width of the transmitting region of the parallax barrier in the tracking mode (the fifth configuration).

According to the above-described configuration, the crosstalk characteristics in the calibration mode are made steeper than the crosstalk characteristics in the tracking mode.

Any one of the first to fourth configurations may be such that the control unit sets the width of the transmitting region of the parallax barrier in the calibration mode to a width smaller than the width of the transmitting region of the parallax barrier in the tracking mode (the sixth configuration).

According to the above-described configuration, the luminance characteristics in the calibration mode are made steeper than the luminance characteristics in the tracking mode.

Any one of the first to sixth configurations may be such that the control unit make the width of the transmitting region and the width of the non-transmitting region equal to each other in the tracking mode (the seventh configuration).

Any one of the first to seventh configurations is preferably such that the switch liquid crystal panel includes: a liquid crystal layer; a first substrate and a second substrate that face each other with the liquid crystal layer being interposed therebetween; a first electrode group that includes a plurality of electrodes that are arranged in the alignment direction at a predetermined interval on the first substrate; and a second electrode group that includes a plurality of electrodes that are arranged in the alignment direction at a predetermined interval on the second substrate, wherein the first electrode group and the second electrode group are arranged so as to be deviated with respect to each other by half of the predetermined interval in the alignment direction (the eighth configuration).

According to the above-described configuration, the parallax barrier can be moved by using half of the above-described predetermined interval as a minimum unit.

Any one of the first to eighth configurations may be such that the display panel is a liquid crystal display panel (the ninth configuration).

EMBODIMENTS

The following describes embodiments of the present invention in detail, while referring to the drawings. In the drawings, identical or equivalent parts in the drawings are denoted by the same reference numerals, and the descriptions of the same are not repeated. To make the explanation easy to understand, in the drawings referred to hereinafter, the configurations are simplified or schematically illustrated, or a part of constituent members are omitted. Further, the dimension ratios of the constituent members illustrated in the drawings do not necessarily indicate the real dimension ratios.

Embodiment 1

Overall Configuration

FIG. 1 is a schematic cross-sectional view illustrating a configuration of a stereoscopic display device 1 according to Embodiment 1 of the present invention. The stereoscopic display device 1 includes a display panel 10, a switch liquid crystal panel 20, and an adhesive resin 30. The display panel 10 and the switch liquid crystal panel 20 are arranged so as to be stacked in such a manner that the switch liquid crystal panel 20 is positioned on the viewer 90 side, and are stuck with each other with the adhesive resin 30.

The display panel 10 includes a TFT (thin film transistor) substrate 11, a CF (color filter) substrate 12, a liquid crystal layer 13, and polarizing plates 14 and 15. The display panel 10 controls TFT substrate 11 and the CF substrate 12 so as to operate the alignment of liquid crystal molecules in the liquid crystal layer 13, thereby to display images.

The switch liquid crystal panel 20 includes a first substrate 21, a second substrate 22, a liquid crystal layer 23, and a polarizing plate 24. The first substrate 21 and the second substrate 22 are arranged so as to be opposed to each other. The liquid crystal layer 23 is interposed between the first substrate 21 and the second substrate 22. The polarizing plate 24 is arranged on the viewer 90 side.

Though FIG. 1 does not illustrate detailed configuration, electrodes are formed on the first substrate 21 and the second substrate 22. The switch liquid crystal panel 20 controls potentials of these electrodes so as to operate the alignment of liquid crystal molecules of the liquid crystal layer 23, thereby to change behavior of light passing through the liquid crystal layer 23. More specifically, the switch liquid crystal panel 23 forms non-transmitting regions (barriers) that block light, and transmitting regions (slits) that transmit light, by using the alignment of the liquid crystal molecules of the liquid crystal layer 23 and the operations of the polarizing plate 15 and the polarizing plate 24. The configurations and operations of the first substrate 21 and the second substrate 22 are to be described in detail below.

The TFT substrate 11 and the CF substrate 12 have a thickness of, for example, 200 μm. The polarizing plate 14 has a thickness of, for example, 137 μm. The polarizing plate 15 has a thickness of, for example, 170 μm. The first and second substrates 21 and 22 have a thickness of, for example, 225 μm each. The thickness of the adhesive resin 30 is, for example, 50 μm.

The polarizing plate 15 may be arranged on the switch liquid crystal panel 20. More specifically, the configuration may be such that the polarizing plate 15 is arranged on a surface on the display panel 10 side of the first substrate 21 of the switch liquid crystal panel 20, and the adhesive resin 30 is arranged between the polarizing plate 15 and the CF substrate 12.

Hereinafter, a direction parallel to a line extending between the left eye 90L and the right eye 90R of the viewer 90 when the viewer 90 and the stereoscopic display device 1 face each other directly (the x direction in FIG. 1) is referred to as a "horizontal direction". Further, the direction orthogonal to the horizontal direction in the surface of the display panel 10 (the y direction in FIG. 1) is referred to as a "vertical direction".

Figure 2:
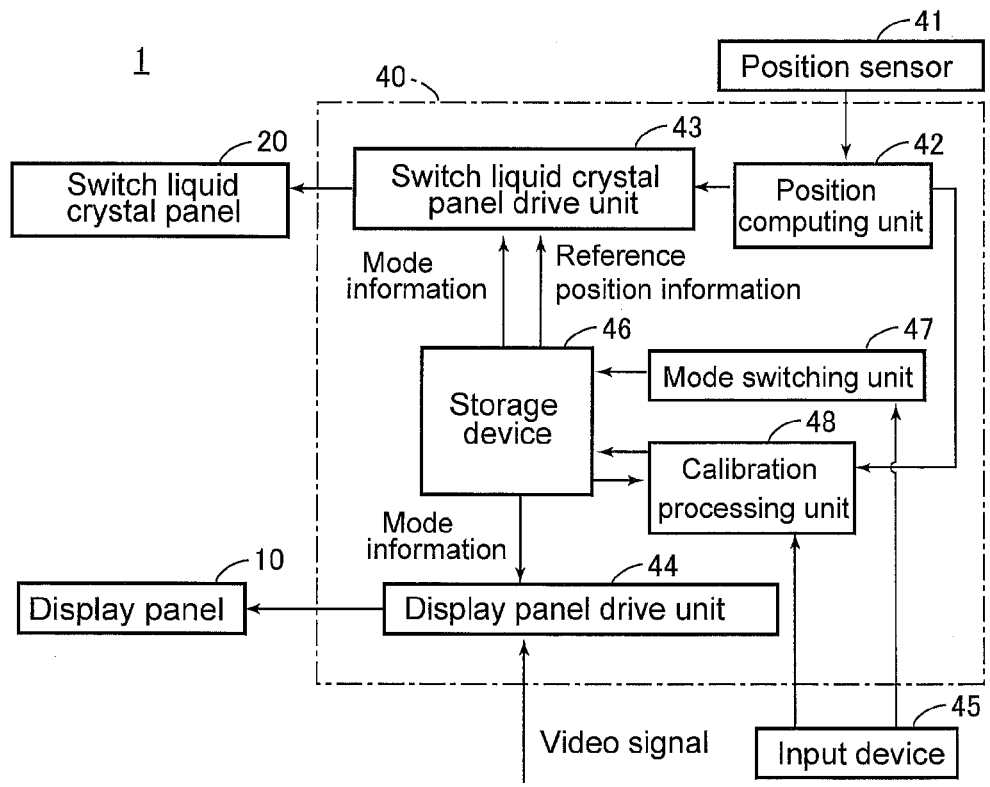
FIG. 2 is a block diagram illustrating a functional configuration of the stereoscopic display device according to Embodiment 1 of the present invention.

FIG. 2 is a block diagram illustrating a functional configuration of the stereoscopic display device 1. The stereoscopic display device 1 further includes a control unit 40, a position sensor 41, and an input device 45. The control unit 40 includes a position computing unit 42, a switch liquid crystal panel drive unit 43, a display panel drive unit 44, a storage device 46, a mode switching unit 47, and a calibration processing unit 48.

The stereoscopic display device 1 has, as display modes, a two-dimensional display mode for displaying a plane image, a three-dimensional display mode for displaying a stereoscopic image, and a calibration mode for calibrating parameters of the three-dimensional display. In addition to the usual three-dimensional display mode, the stereoscopic display device 1 further has a tracking three-dimensional display mode (tracking mode) to be described below.

The viewer 90 can switch the display mode by operating the input device 45. The input device 45 is, for example, a remote controller. When the viewer 90 operates the input device 45 to select the display mode, the mode switching unit 47 causes the storage device 46 to store information of the display mode thus selected (mode information).

The switch liquid crystal panel drive unit 43 and the display panel drive unit 44 refers to the mode information stored in the storage device 46, and performs an operation in accordance with the mode information.

In the two-dimensional display mode, the display panel drive unit 44 drives the display panel 10 based on video signals input from outside, so as to cause the display panel 10 to display an image. The switch liquid crystal panel drive unit 43 causes the entire surface of the switch liquid crystal panel 20 to be shifted to the transparent state, so as to allow an image displayed on the display panel 10 to be displayed without any change.

In the three-dimensional display mode and the tracking mode, the display panel drive unit 44 causes the pixels of the display panel 10 to display an image for the right eye (right-eye image) and an image for the left eye (left-eye image) alternately in the horizontal direction. The switch liquid crystal panel drive unit 43 causes barriers BR that block light and slits SL that transmit light to be formed in the switch liquid crystal panel 20.

Figure 3:
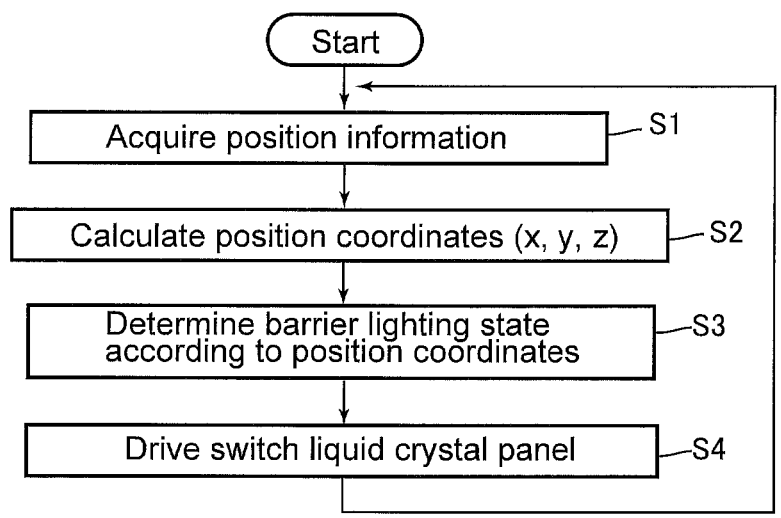
FIG. 3 is a flowchart of a processing by the stereoscopic display device according to Embodiment 1 of the present invention.

Next, operations of the stereoscopic display device 1 in the tracking mode are described with reference to FIGS. 2 and 3. FIG. 3 is a flowchart illustrating processing operations by the stereoscopic display device 1 in the tracking mode.

First, the position sensor 41 acquires position information regarding the position of the viewer 90 (Step S1). The position sensor 41 is, for example, a camera or an infrared light sensor. The position sensor 41 supplies the acquired position information to the position computing unit 42 of the control unit 40.

The position computing unit 42 analyzes the position information of the viewer 90 supplied from the position sensor 41, and calculates position coordinates (x, y, z) of the viewer 90 (Step S2). The calculation of the position coordinates can be performed by, for example, an eye tracking system for detecting the position of the eyes of the viewer 90 by image processing. Alternatively, the calculation of the position coordinates may be performed by a head tracking system for detecting the position of the head of the viewer 90 with infrared light. The position computing unit 42 supplies the calculated position coordinates to the switch liquid crystal panel drive unit 43.

The switch liquid crystal panel drive unit 43 determines a barrier lighting state of the switch liquid crystal panel 20 according to the position coordinates of the viewer 90 (Step S3). More specifically, according to the position coordinates of the viewer 90, the positions of the barriers and the positions of the slits are determined.

The switch liquid crystal panel drive unit 43 drives the switch liquid crystal panel 20 so as to cause the switch liquid crystal panel 20 to display the parallax barrier (Step S4). Thereafter, Steps S1 to S4 are repeated.

Next, the following description explains principles of the stereoscopic display by the stereoscopic display device 1, using FIGS. 4A to 4C and FIGS. 5A to 5C.

Figure 4A:
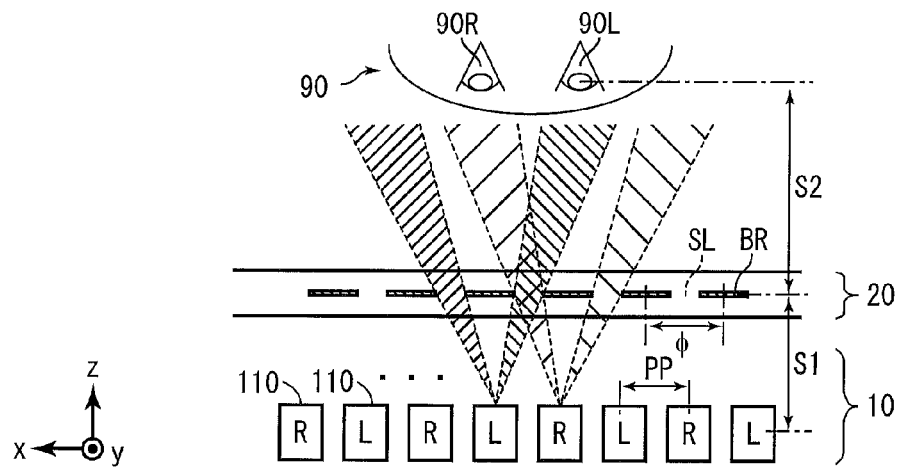
FIG. 4A is a view for explaining principles of the stereoscopic display by the stereoscopic display device according to Embodiment 1 of the present invention.
Figure 4B:
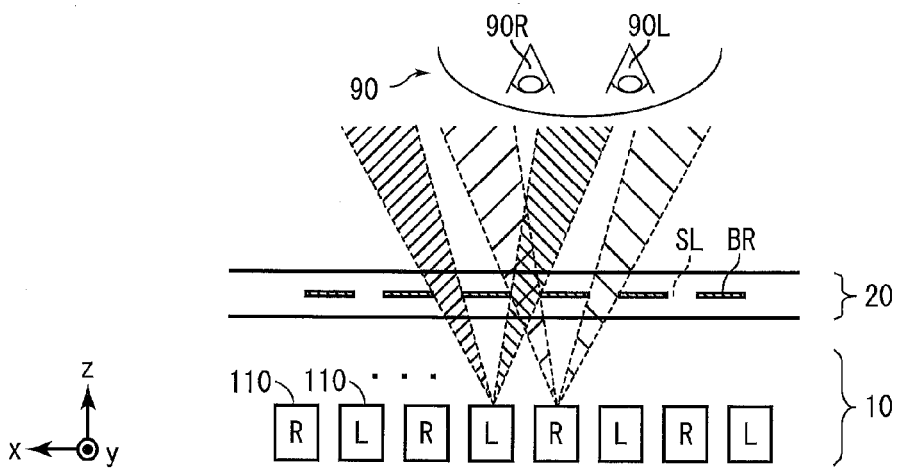
FIG. 4B is a view for explaining principles of the stereoscopic display by the stereoscopic display device according to Embodiment 1 of the present invention.
Figure 4C:
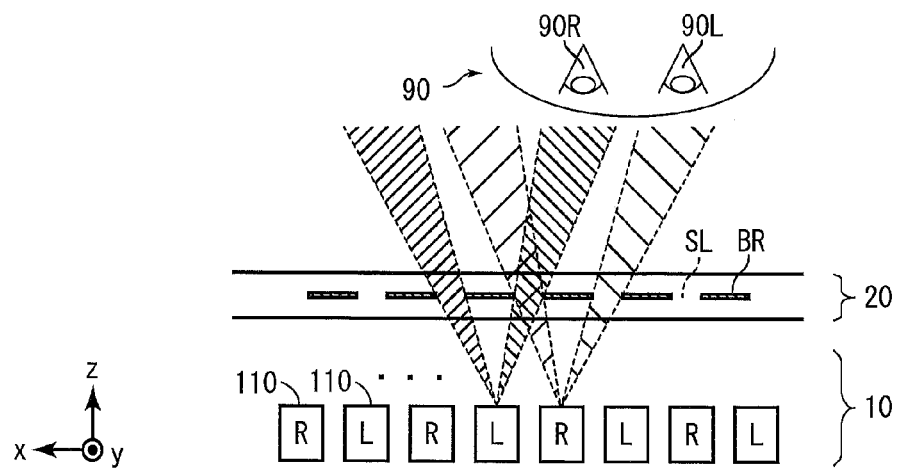
FIG. 4C is a view for explaining principles of the stereoscopic display by the stereoscopic display device according to Embodiment 1 of the present invention.

First of all, a case is explained where the barrier lighting state is fixed (normal three-dimensional mode), with reference to FIGS. 4A to 4C. The display panel 10 includes a plurality of pixels 110. On the pixels 110, a right-eye image (R) and a left-eye image (L) are alternately displayed in the horizontal direction. In the switch liquid crystal panel 20, barriers BR that block light and slits SL that transmit light are formed at predetermined intervals. This allows only the right-eye image (R) to be visible to the right eye 90R of the viewer 90, and allows only the left-eye image (L) to be visible to the left eye 90L, as illustrated in FIG. 4A. This allows the viewer 90 to have a stereoscopic vision.

The interval PP of the pixels 110 and the interval φ of the barriers BR satisfy the following expression when S2 is sufficiently greater than S1:

$$\varphi \approx 2 \times PP$$

where S1 is a distance from the display surface of the display panel 10 to the barriers BR, and S2 is a distance from the barriers BR to the viewer 90.

FIG. 4B illustrates a state in which the viewer 90 has moved from the position shown in FIG. 4A in the horizontal direction. In this case, to the right eye 90R of the viewer 90, both of the right-eye image (R) and the left-eye image (L) are visible. Similarly, to the left eye 90L, both of the right-eye image (R) and the left-eye image (L) are visible. In other words, crosstalk is occurring, and the viewer 90 cannot have a stereoscopic vision.

FIG. 4C illustrates a state in which the viewer 90 has further moved from the position shown in FIG. 4B in the horizontal direction. In this case, to the right eye 90R of the viewer 90, the left-eye image (L) is visible, and to the left eye 90L thereof, the right-eye image (R) is visible. In this case, the state of pseudoscopic vision occurs wherein a video image that should be recognized as being positioned behind is observed in the foreground, and in contrast, a video image that should be recognized as being positioned in the foreground is observed behind, which makes the viewer 90 unable to have an appropriate stereoscopic vision, and give uncomfortable feeling to him/her.

In this way, as the viewer 90 moves, a normal area where a stereoscopic vision can be obtained, a crosstalk area where crosstalk occurs, and a pseudoscopic area where the state of pseudoscopic vision occurs, appear repeatedly. Therefore, in the case where the barrier lighting state is fixed, the viewer 90 can have a stereoscopic vision only in limited areas.

Figure 5A:
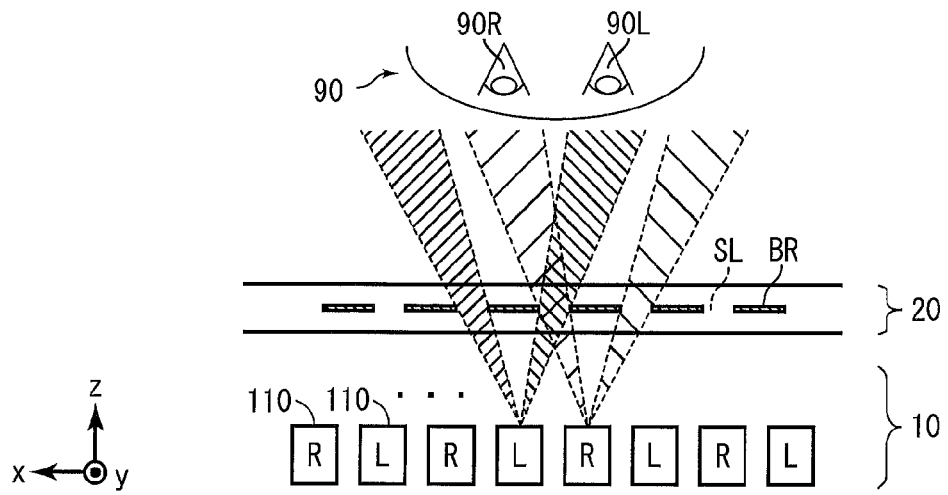
FIG. 5A is a view for explaining principles of the stereoscopic display by the stereoscopic display device according to Embodiment 1 of the present invention.
Figure 5B:
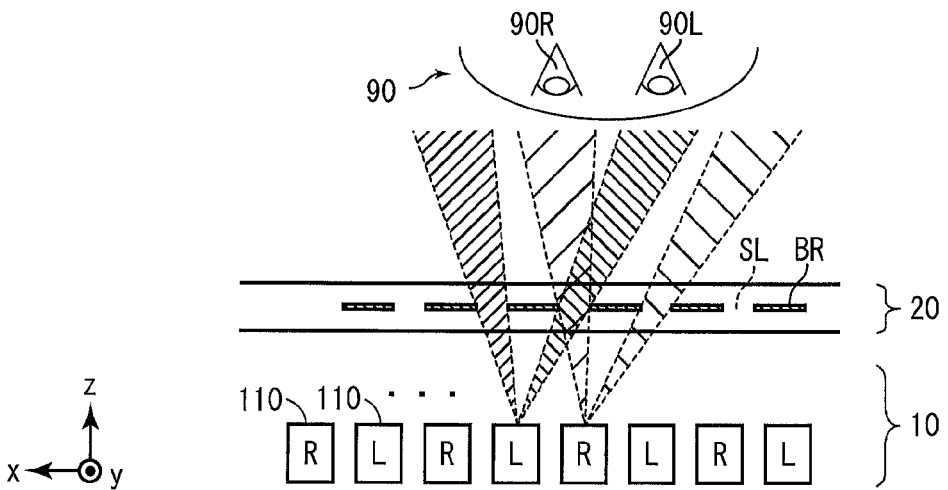
FIG. 5B is a view for explaining principles of the stereoscopic display by the stereoscopic display device according to Embodiment 1 of the present invention.
Figure 5C:
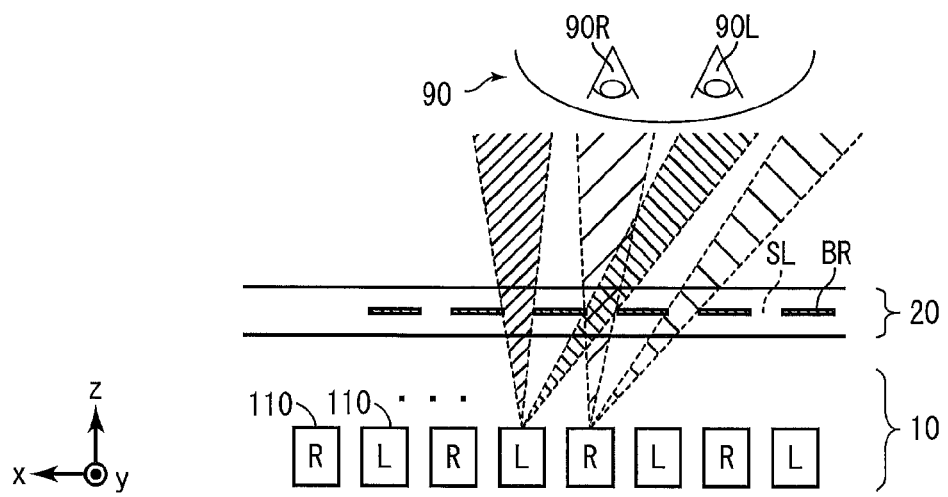
FIG. 5C is a view for explaining principles of the stereoscopic display by the stereoscopic display device according to Embodiment 1 of the present invention.

In the tracking mode, as illustrated in FIGS. 5A to 5C, the control unit 40 changes the barrier light state of the switch liquid crystal panel 20 according to the position information (position coordinates) of the viewer 90. This allows the viewer 90 to have stereoscopic vision at all times, and prevents crosstalk and the state of pseudoscopic vision from occurring.

Here, in order that the parallax barrier is to be displayed at an appropriate position, it is necessary that the position information of the viewer 90 and the position of the parallax barrier should correspond appropriately. For this purpose, it is necessary that the reference position used when the parallax barrier is moved should correspond appropriately to the reference position of the position information. For example, it is necessary that the center of the parallax barrier should coincide with the center of the position sensor.

The storage device 46 (FIG. 2) stores information about the reference position when the parallax barrier is moved (reference position information). The switch liquid crystal panel drive unit 43 determines the position of the parallax barrier displayed by the switch liquid crystal panel 20, based on the reference position information stored in the storage device 46 and the position information supplied from the position computing unit 42.

The viewer 90 can switch the display mode of the stereoscopic display device 1 to the calibration mode, and calibrate the reference position information. The viewer 90 calibrates the reference position information through an operation in the form of dialogue with the display panel 10 via the input device 45. Details of the calibration mode are to be described below.

[Configuration of Switch Liquid Crystal Panel 20]

Next, details of the configuration of the switch liquid crystal panel 20 are described.

Figure 6A:
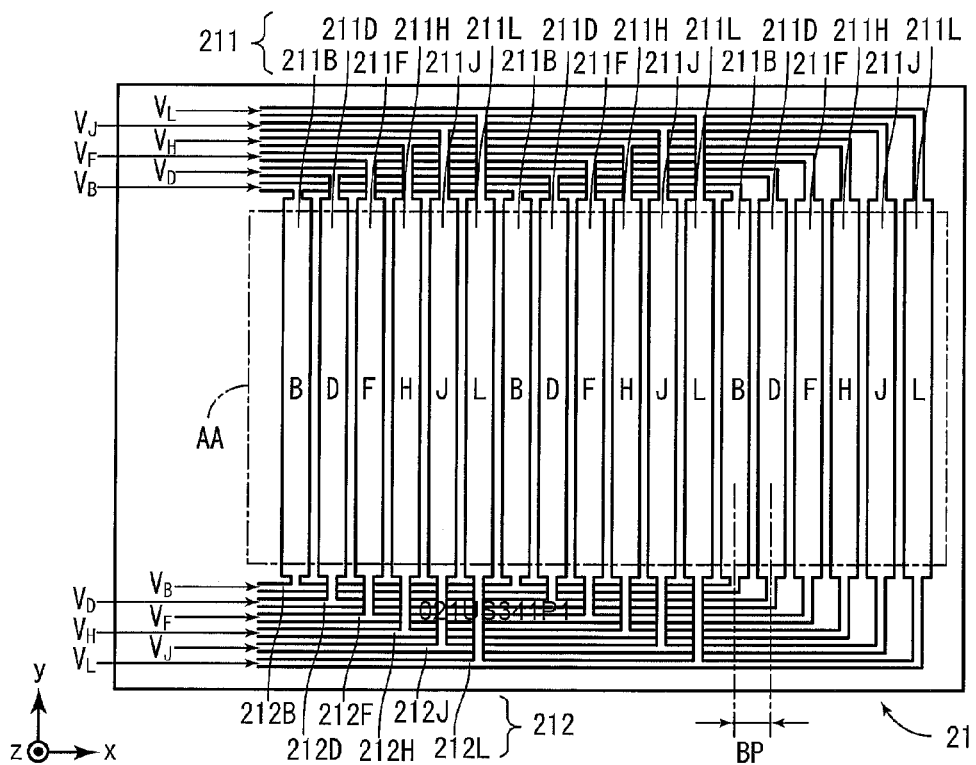
FIG. 6A is a plan view illustrating a configuration of a first substrate of a switch liquid crystal panel.

FIG. 6A is a plan view illustrating a configuration of the first substrate 21 of the switch liquid crystal panel 20. On the first substrate 21, a first electrode group 211 is formed. The first electrode group 211 includes a plurality of electrodes arranged in the x direction at electrode intervals BP. Each of the electrodes extends in the y direction, and they are arranged in parallel to one another.

On the first substrate 21, there is further formed a line group 212 that is electrically connected with the first electrode group 211. The line group 212 is preferably formed outside a region that overlaps a display region of the display panel 10 (an active area AA) when the switch liquid crystal panel 20 is stacked on the display panel 10.

Figure 6B:
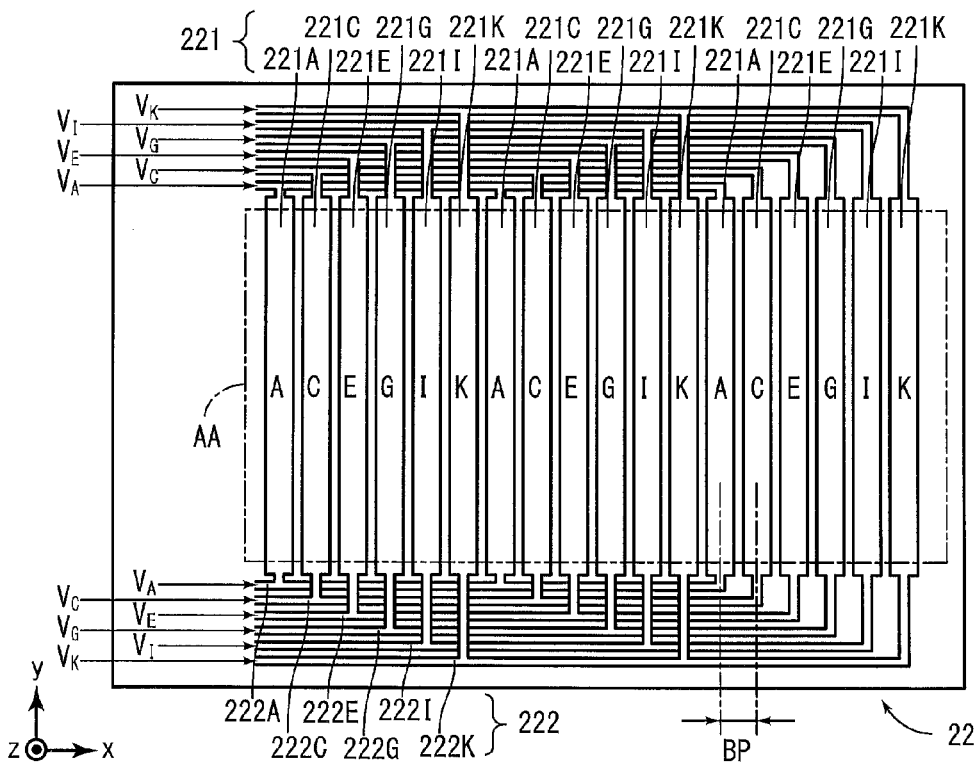
FIG. 6B is a plan view illustrating a configuration of a second substrate of the switch liquid crystal panel.

FIG. 6B is a plan view illustrating a configuration of the second substrate 22 of the switch liquid crystal panel 20. On the second substrate 22, a second electrode group 221 is formed. The second electrode group 221 includes a plurality of electrodes arranged in the x direction at the electrode intervals BP. Each of the electrodes extends in the y direction, and they are arranged in parallel to one another.

On the second substrate 22, there is further formed a line group 222 that is electrically connected with the second electrode group 221. The line group 222 is preferably formed outside the active area AA, as is the case with the line group 212.

To the first electrode group 211 and the second electrode group 221, signals of twelve systems, i.e., signals $V_A$ to $V_L$, are supplied from the control unit 40. More specifically, to the first electrode group 211, signals of six systems, i.e., signals $V_B$, $V_D$, $V_F$, $V_H$, $V_J$, and $V_L$ are supplied via the line group 212. To the second electrode group 221, signals of six systems, i.e., signals $V_A$, $V_C$, $V_E$, $V_G$, $V_I$, and $V_K$ are supplied via the line group 222.

Hereinafter, the electrodes to which the signals $V_B$, $V_D$, $V_F$, $V_H$, $V_J$, and $V_L$ are supplied, among the electrodes of the first electrode group 211, are referred to as electrodes 211B, 211D, 211F, 211H, 211J, and 211L, respectively. Further, lines electrically connected with the electrodes 211B, 211D, 211F, 211H, 211J, and 211L are referred to as lines 212B, 212D, 212F, 212H, 212J, and 212L, respectively.

Regarding the electrodes of the second electrode group 221, similarly, the electrodes to which the signals $V_A$, $V_C$, $V_E$, $V_G$, $V_I$, and $V_K$ are supplied are referred to as electrodes 221A, 221C, 221E, 221G, 221I, and 221K, respectively. Further, the lines electrically connected with the electrodes 221A, 221C, 221E, 221G, 221I, and 221K are referred to as lines 222A, 222C, 222E, 222G, 222I, and 222K, respectively.

The electrodes 211B, 211D, 211F, 211H, 211J, and 211L are arranged in periodic fashion in the x direction in the stated order. In other words, the configuration is such that the same signal should be supplied to a certain electrode, and an electrode that is sixth with respect to the certain electrode. Similarly, the electrodes 221A, 221C, 221E, 221G, 221I, and 221K are arranged in periodic fashion in the x direction in the stated order.

Figure 7:
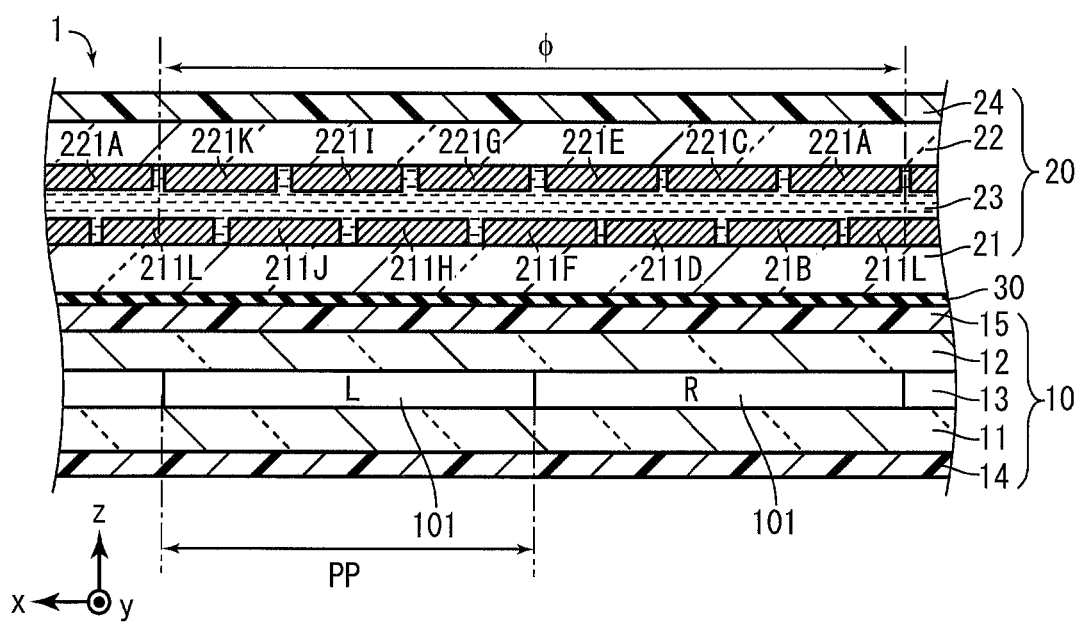
FIG. 7 is a cross-sectional view illustrating a schematic configuration of a stereoscopic display device according to Embodiment 1 of the present invention.
Figure 8:
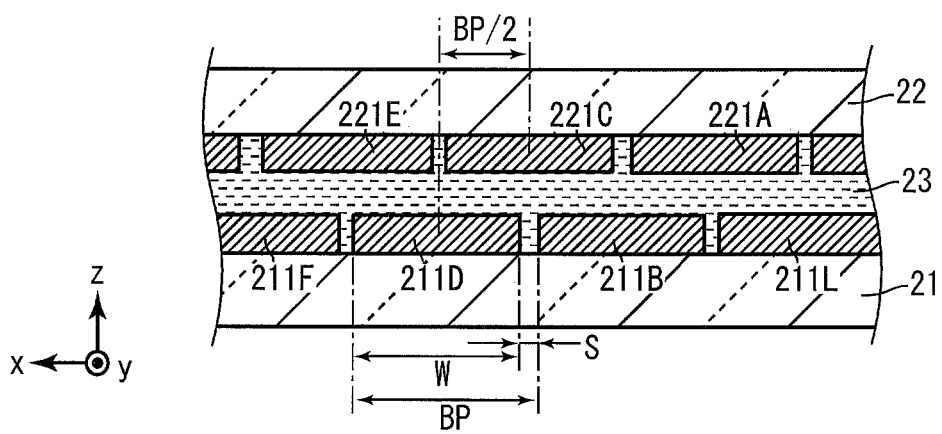
FIG. 8 is an enlarged cross-sectional view illustrating a part of the switch liquid crystal panel.

FIG. 7 is a cross-sectional view illustrating a schematic configuration of the stereoscopic display device 1. FIG. 8 is an enlarged cross-sectional view illustrating a part of the switch liquid crystal panel 20. As illustrated in FIGS. 7 and 8, the first electrode group 211 and the second electrode group 221 are arranged so as to be deviated with respect to each other in the x direction. Preferably, the first electrode group 211 and the second electrode group 221 are arranged so as to be deviated with respect to each other in the x direction by half of the electrode interval BP as in the example illustrated in FIG. 8.

It should be noted that the electrode interval BP is a sum of the width W of the electrode and the clearance S between the electrodes. In the present embodiment, the configuration satisfies $BP=\varphi/6 \approx PP/3$. More specifically, an exemplary configuration is as follows: the electrode pitch PP=53.7 μm; the barrier pitch BP=17.92 μm; the width of the electrode W=13.92 μm; the clearance between electrode S=4 μm; and the barrier movement pitch BP/2=8.96 μm.

Though not illustrated in FIGS. 7 and 8, alignment films are formed on the first substrate 21 and the second substrate 22, respectively. The alignment formed on the first substrate 21 and the alignment film formed on the second substrate 22 are rubbed in directions that intersect with each other, respectively. This causes the liquid crystal molecules of the liquid crystal layer 23 to be aligned in a state of the so-called twisted nematic alignment, in which the alignment direction is rotated in a region from the first substrate 21 toward the second substrate 22, in a no-voltage applied state.

Further, the polarizing plate 15 and the polarizing plate 24 are arranged in such a manner that the light transmission axes thereof orthogonally intersect each other. In other words, the liquid crystal of the switch liquid crystal panel 20 according to the present embodiment is so-called normally white liquid crystal, in which the maximum transmittance is obtained when no voltage is applied to the liquid crystal layer 23.

Regarding the configuration of the alignment film, as is the case with the switch liquid crystal panel 20 according to the present embodiment, twisted nematic liquid crystal, which provides high transmittance, is preferably used. Further, regarding the configuration of the polarizing plate, normally white is preferable. This is because normally white liquid crystal is in a no-voltage-applied state in the two-dimensional display mode, which enables to reduce electric power consumption.

Hereinafter, an exemplary specific configuration of the first substrate 21, and a method for producing the same, are described, with reference to FIGS. 9A to 9C. The second substrate 22 may have a configuration identical to that of the first substrate 21, and may be produced in the same manner as that for the first substrate 21.

Figure 9A:
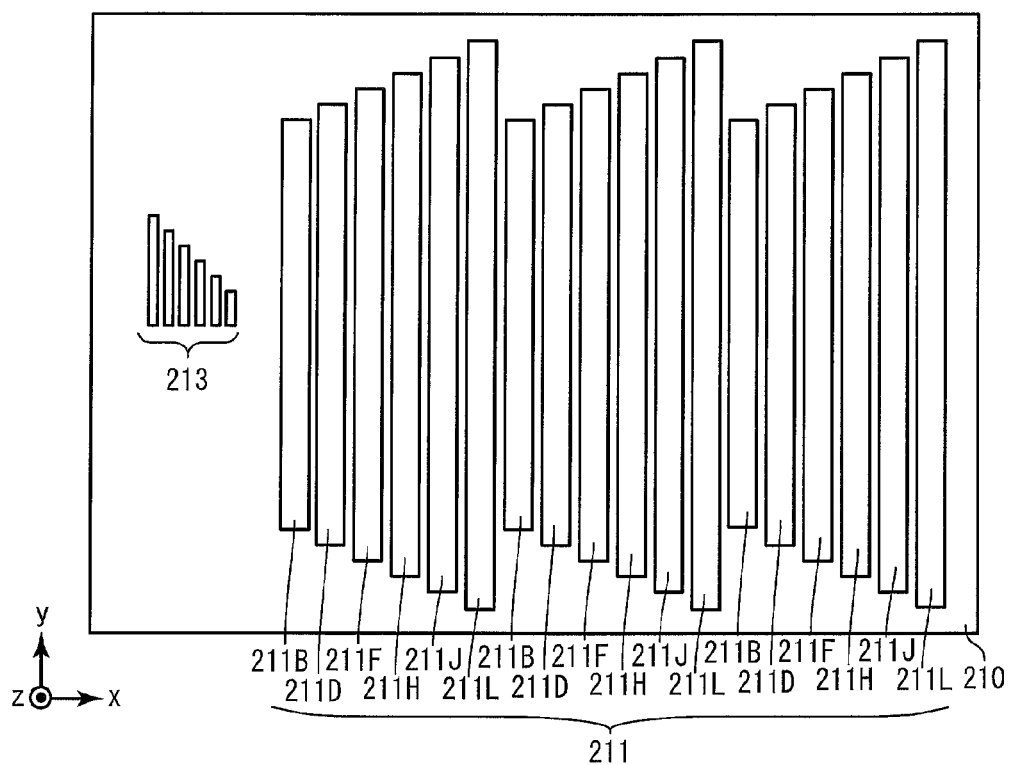
FIG. 9A is a view for explaining an exemplary method for producing the first substrate.

First of all, as illustrated in FIG. 9A, the first electrode group 211 and relay electrodes 213 are formed on the substrate 210. The relay electrodes 213 are electrodes for relaying the line group 212 that is to be formed in a later step. The substrate 210 is a substrate that has translucency and insulation properties, for example, a glass substrate. The first electrode group 211 preferably has translucency. In a case where the relay electrodes 213 are formed in the active area, the relay electrodes 213 preferably have translucency as well. On the other hand, in a case where the relay electrodes 213 are formed outside the active area, the relay electrodes 213 are not required to have translucency. The first electrode group 211 and the relay electrodes 213 are made of, for example, indium tin oxide (ITO). In the case where the relay electrodes 213 are formed outside the active area, the relay electrodes 213 may be made of, for example, aluminum. The first electrode group 211 and the relay electrodes 213 are formed by the following process, for example: films are formed by sputtering or chemical vapor deposition (CVD), and are patterned by photolithography.

Figure 9B:
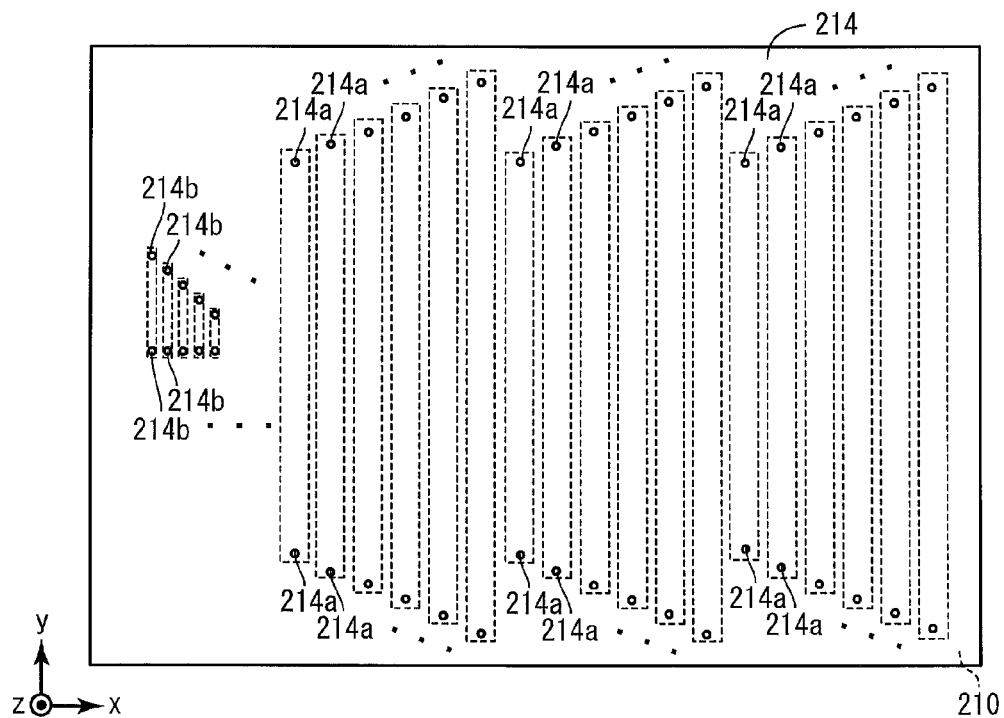
FIG. 9B is a view for explaining an exemplary method for producing the first substrate.

Next, as illustrated in FIG. 9B, an insulating film 214 is formed so as to cover the substrate 210, the first electrode group 211, and the relay electrodes 213. In the insulating film 214, contact holes 214a and contact holes 214b are formed. The contact holes 214a are formed at such positions as to allow the first electrode group 211 and the line group 212, which is to be formed in the next step, to be connected with each other. The contact holes 214b are formed at such positions as to allow the relay electrodes 213 and the line group 212 to be connected with each other.

The insulating film 214 preferably has translucency, and is made of, for example, SiN. The insulating film 214, for example, is formed with a film formed by CVD, and the contact holes 214a and the contact holes 214b are formed therein by photolithography. In a case where the line group 212 is formed outside the active area, the patterning may be performed in such a manner that the insulating film 214 is formed only outside the active area.

Figure 9C:
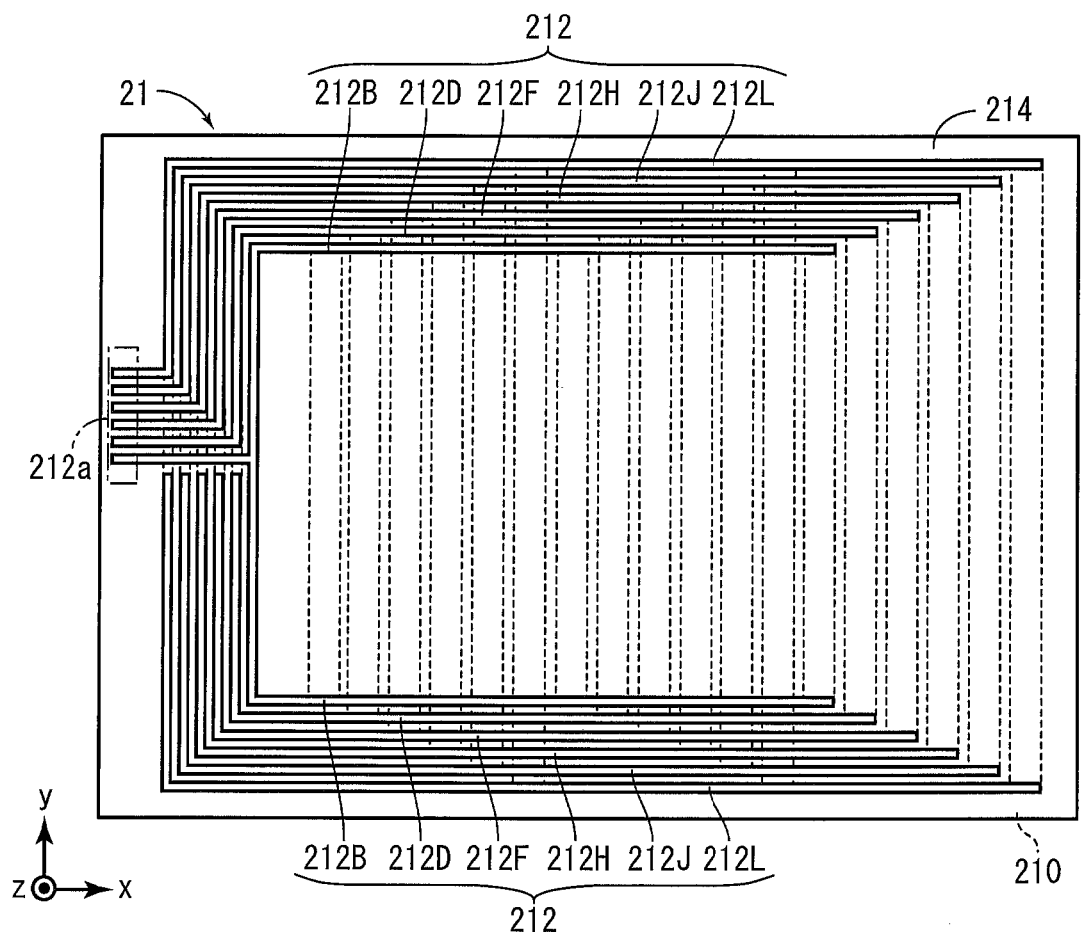
FIG. 9C is a view for explaining an exemplary method for producing the first substrate.

Next, as illustrated in FIG. 9C, the line group 212 is formed. The line group 212 is connected via the contact holes 214a to the first electrode group 211, and is connected via the contact holes 214b to the relay electrodes 213. The line group 212 preferably has high conductivity, and is made of, for example, aluminum. The line group 212 may be made of ITO. The line group 212 is formed by the following process, for example: a film is formed by sputtering, and is patterned by photolithography.

As described above, the electrodes 211B, 211D, 211F, 211H, 211J, and 211L are connected with the lines 212B, 212D, 212F, 212H, 212J, and 212L, respectively. With this three-layer configuration of the first electrode group 211, the insulating layer 214, and the line group 212, the first electrode group 211 and the line group 212 are caused to intersect as viewed in a plan view.

In the example illustrated in FIG. 9C, ends on one side of the line group 212 are gathered in the vicinities of a peripheral part of the substrate 21, and form a terminal part 212a. To the terminal part 212a, a flexible printed circuit (FPC) and the like is connected.

In the example illustrated in FIG. 9C, lines are connected to ends on both sides in the y direction of each electrode of the electrode group 211. The pair of lines connected to ends on both sides in the y direction of each electrode of the electrode group 211 are connected with each other by the relay electrodes 213. By applying a signal from both ends in the y direction of each electrode of the electrode group 211, a potential difference in the inside of each electrode can be reduced.

[Method for Driving Switch Liquid Crystal Panel 20]

Figure 10:
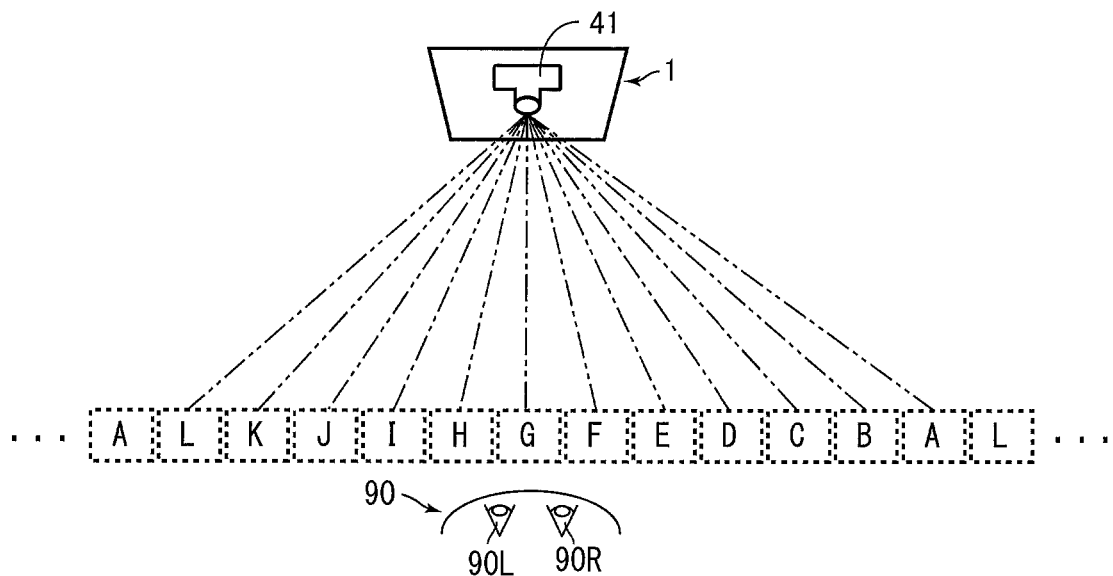
FIG. 10 is a schematic diagram illustrating the position relationship between a stereoscopic display device and a viewer.

FIG. 10 is a schematic diagram illustrating the position relationship between the stereoscopic display device 1 and the viewer 90. As described above, the stereoscopic display device 1 acquires the position information of the viewer 90 by the position sensor 41. The stereoscopic display device 1 recognizes the position of the viewer 90 according to twelve areas, that is, areas A to L illustrated in FIG. 10, and displays parallax barriers corresponding to the areas, respectively.

Figure 11A:
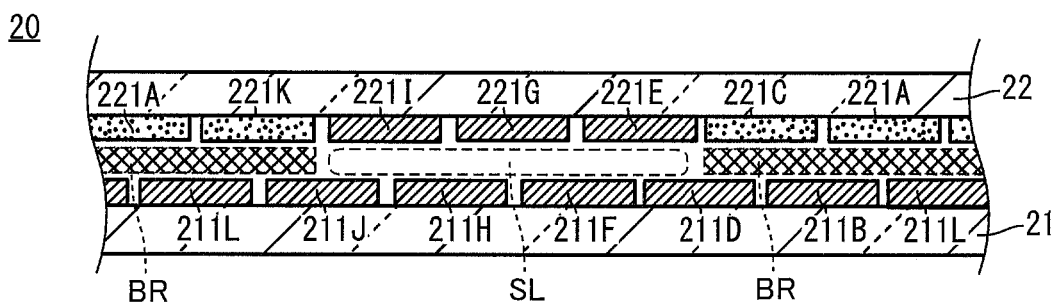
FIG. 11A is a cross-sectional view schematically illustrating a barrier lighting state to be displayed on the switch liquid crystal panel, when the viewer is in the region G illustrated in FIG. 10.

FIG. 11A is a cross-sectional view schematically illustrating a barrier lighting state to be displayed on the switch liquid crystal panel 20, when the viewer 90 is in the region G illustrated in FIG. 10.

The control unit 40 (FIG. 2) causes the polarity of a part of electrodes included in one electrode group selected from the first electrode group 211 and the second electrode group 221, and the polarity of the other electrodes, to be opposite to each other. FIG. 11A schematically illustrates electrodes having a different polarity, by indicating the same with a sandy pattern. The same indication is also used in FIG. 11B to be referred to below.

In the region G, electrodes 221A, 221C, and 221K included in the second electrode group 221, and the other electrodes (the electrodes 221E, 221G, 221I, and 211B to 211L) are caused to have opposite polarities, respectively.

This allows a potential difference to occur between the electrode 221A and the electrode 211B, thereby causing the liquid crystal molecules of the liquid crystal layer 23 therebetween to be aligned in the z direction. The switch liquid crystal panel 20 is normally white liquid crystal. Therefore, the barrier BR is formed in a portion where the electrode 221A and the electrode 211B overlap as viewed in a plan view (the xy plan view).

Similarly, the barriers BR are formed in portions where the electrode 211B and the electrode 221C overlap, the electrode 221C and the electrode 211D overlap, the electrode 211J and the electrode 221K overlap, the electrode 221K and the electrode 211L overlap, and the electrode 211L and the electrode 221A overlap, as viewed in the plan view.

On the other hand, no potential difference occurs to between the electrode 211D and the electrode 221E. As described above, the switch liquid crystal panel 20 is normally white liquid crystal. Therefore, the slit SL is formed in a portion where the electrode 211D and the electrode 221E overlap as viewed in the plan view.

Similarly, the slits SL are formed in portions where the electrode 221E and the electrode 211F overlap, the electrode 211F and the electrode 221G overlap, the electrode 221G and the electrode 211H overlap, the electrode 211H and the electrode 221I overlap, as well as the electrode 221I and the electrode 211J overlap, as viewed in a plan view.

As a result, the barrier BR is formed in a portion that overlaps the electrodes 221A, 221C, and 221K, as viewed in a plan view, and the slit SL is formed in a portion that overlaps the electrodes 221E, 221G, and 221I as viewed in a plan view.

Figure 11B:
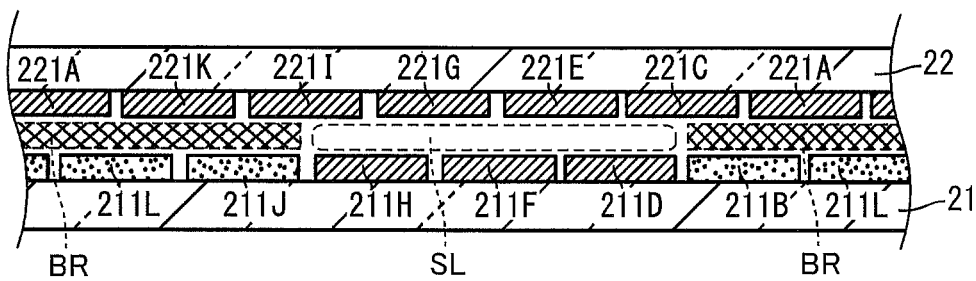
FIG. 11B is a cross-sectional view schematically illustrating a barrier lighting state to be displayed on the switch liquid crystal panel, when the viewer is in the region F illustrated in FIG. 10.

FIG. 11B is a cross-sectional view schematically illustrating a barrier lighting state to be displayed on the switch liquid crystal panel 20, when the viewer 90 is in the region F illustrated in FIG. 10.

In the region F, electrodes 211B, 211J, and 211L included in the second electrode group 221, and the other electrodes (the electrodes 211D, 211F, 211H, and 221A to 221K) are caused to have opposite polarities, respectively.

This causes a barrier BR to be formed in a portion that overlaps the electrodes 211B, 211J, 211L as viewed in a plan view, and causes a slit SL to be formed in a portion that overlaps the electrodes 211D, 211F, and 211H as viewed in a plan view.

As is clear from comparison between FIG. 11A and FIG. 11B, with this configuration of the switch liquid crystal panel 20, the barrier lighting state can be controlled using half of the electrode interval BP as a minimum unit.

[Relationship Between Slit Width and Display Properties of Stereoscopic Display Device 1]

Next, the relationship between the slit width of the parallax barrier and display properties of the stereoscopic display device 1 is described.

First, with reference to FIGS. 12A to 12C, and FIG. 13, the width of a slit, and luminance characteristics of the stereoscopic display device 1 (angle dependency of luminance) is described.

Figure 12A:
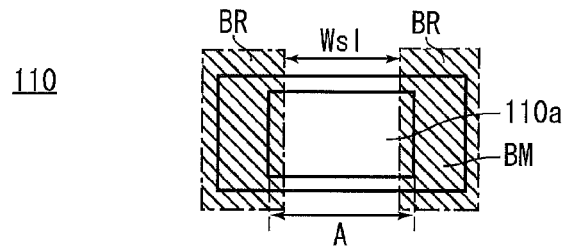
FIG. 12A schematically illustrates a case where the width of a slit is narrower than that of an opening.
Figure 12B:
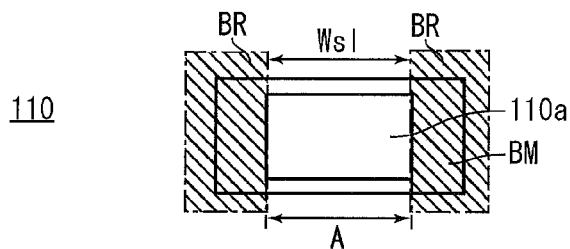
FIG. 12B schematically illustrates a case where the width of the slit is approximately equal to that of the opening.
Figure 12C:
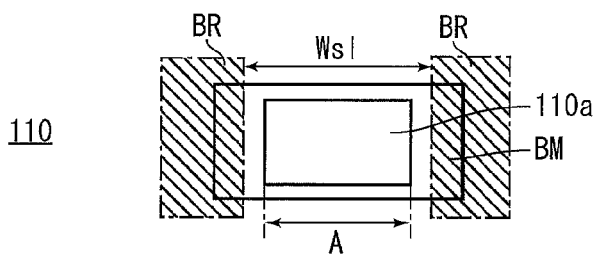
FIG. 12C schematically illustrates a case where the width of the slit is wider than that of the opening.

Each of the pixels 110 includes a black matrix BM and an opening 110a. FIG. 12A schematically illustrates a case where the slit width Wsl is smaller than the width A of the opening 110a; FIG. 12B schematically illustrates a case where the slit width Wsl is approximately equal to the width A of the opening 110a; and FIG. 12A schematically illustrates a case where the slit width Wsl is greater than the width A of the opening 110a. In FIGS. 12A to 12C, the barrier BR is schematically indicated by hatching.

Figure 13:
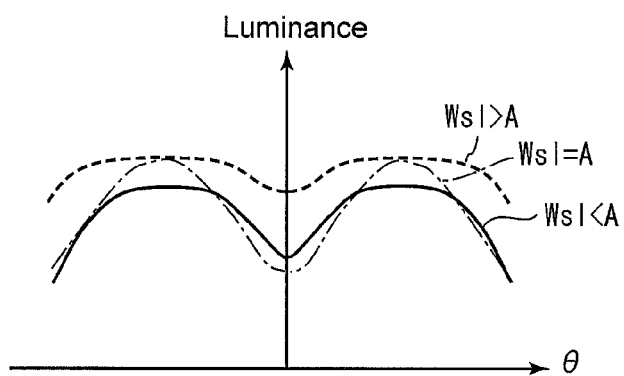
FIG. 13 schematically illustrates the relationship between the slit width and luminance characteristics of the stereoscopic display device.

FIG. 13 schematically illustrates the relationship between the slit width Wsl and luminance characteristics of the stereoscopic display device 1. In the case where the slit width Wsl is smaller than the width A of the opening 110a (Wsl<A), the luminance decreases as a whole. In the case where the slit width Wsl is approximately equal to the width A of the opening 110a (Wsl=A), a high luminance is obtained at an eye point, but the luminance characteristics are steep. In other words, when the viewer 90 moves the head, the luminance changes abruptly. In the case where the slit width Wsl is greater than the width A of the opening 110a (Wsl>A), a high luminance is obtained at the eye point, and the luminance characteristics are flat.

In this way, from the viewpoint of luminance characteristics, it is preferable that the slit has a greater width Wsl.

Next, with reference to FIGS. 12A to 12C and FIG. 16, the slit width and the crosstalk characteristics of the stereoscopic display device 1 (angle dependency of crosstalk) are described. For this, first, crosstalk is quantitatively defined herein by using FIG. 14.

Figure 14:
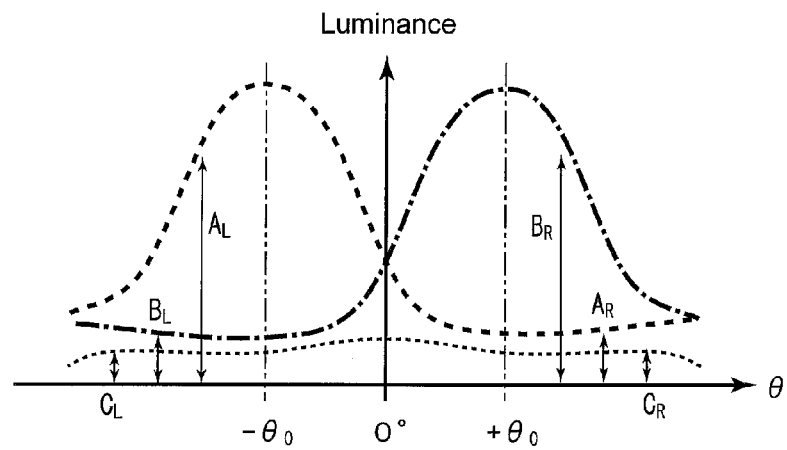
FIG. 14 illustrates angle properties of luminance of the stereoscopic display device in a case where the barrier light state is fixed.

FIG. 14 illustrates angle properties of luminance of the stereoscopic display device 1 in a case where the barrier lighting state is fixed. Luminance $A_L$ is luminance detected in an angle range satisfying "the angle $\theta<0$" when a black image is displayed as a right-eye image and a white image is displayed as a left-eye image. Luminance $A_R$ is luminance detected on the same screen in an angle range satisfying "the angle $\theta>0$". Luminance $B_L$ is luminance detected in an angle range satisfying "the angle $\theta<0$" when a white image is displayed as a right-eye image and a black image is displayed as a left-eye image. Luminance $B_R$ is luminance detected on the same screen in an angle range satisfying "the angle $\theta>0$". Luminance $C_L$ is luminance detected in an angle range satisfying "the angle $\theta<0$" when black images are displayed as both of the right-eye image and the left-eye image. Luminance $C_R$ is luminance detected on the same screen in an angle range satisfying "the angle $\theta>0$".

Here, crosstalk XT(L) for the left eye is defined by the following expression:

$$XT(L)[\%] = \frac{B_L(\theta) - C_L(\theta)}{A_L(\theta) - C_L(\theta)} \times 100 \qquad \text{[Formula 1]}$$

Similarly, crosstalk XT(R) for the right eye is defined by the following expression:

$$XT(R)[\%] = \frac{B_R(\theta) - C_R(\theta)}{A_R(\theta) - C_R(\theta)} \times 100 \qquad \text{[Formula 2]}$$

Figure 15:
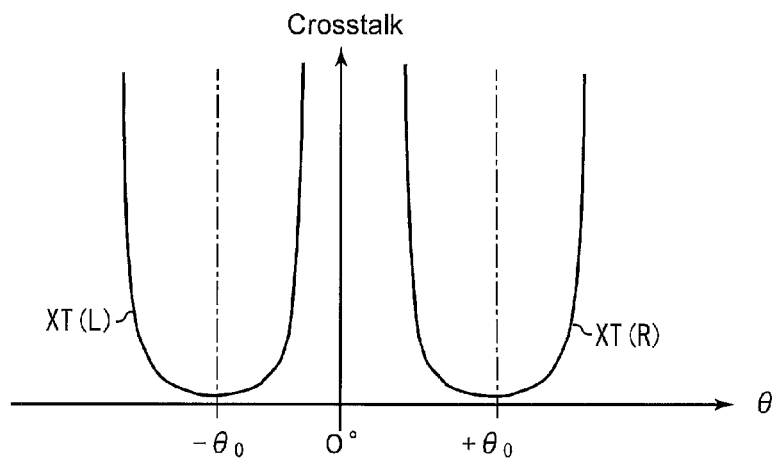
FIG. 15 illustrates angle properties of crosstalk XT(L) of the left eye and crosstalk XT(R) of the right eye.

FIG. 15 illustrates angle characteristics of crosstalk XT(L) for the left eye and crosstalk XT(R) for the right eye. The crosstalk XT(L) for the left eye has a minimum value at an angle $-\theta_0$, and increases as the angle increases/decreases from the angle $-\theta_0$. Similarly, the crosstalk XT(R) for the right eye has a minimum value at an angle $+\theta_0$, and increases as the angle increases/decreases from the angle $+\theta_0$.

Figure 16:
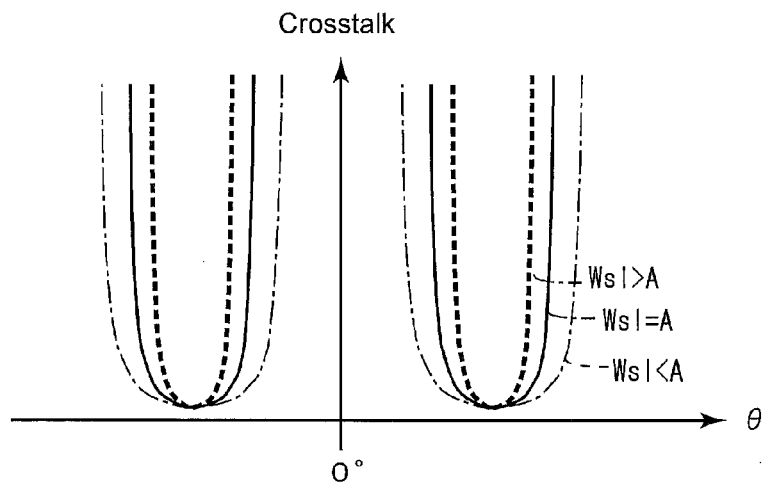
FIG. 16 schematically illustrates the relationship between the slit width and crosstalk characteristics of the stereoscopic display device.

FIG. 16 schematically illustrates the relationship between the slit width Wsl and crosstalk characteristics of the stereoscopic display device 1. As illustrated in FIG. 16, as the slit width Wsl is smaller, the crosstalk characteristics are flatter. In other words, as the slit width Wsl is smaller, crosstalk is low in larger areas.

In this way, from the viewpoint of crosstalk characteristics, it is preferable that the slit width Wsl is small.

As described above, the luminance characteristics and the crosstalk characteristics are in the trade-off relationship. In the stereoscopic display device 1, therefore, an optimal slit width Wsl is set with the balance between the luminance characteristics and the crosstalk characteristics being taken into consideration.

In the present embodiment, in the tracking mode and in the calibration mode, different widths are set as the slit widths Wsl, respectively. More specifically, the slit width Wsl in the calibration mode is set to be greater that the slit width Wsl in the tracking mode.

Figure 17A:
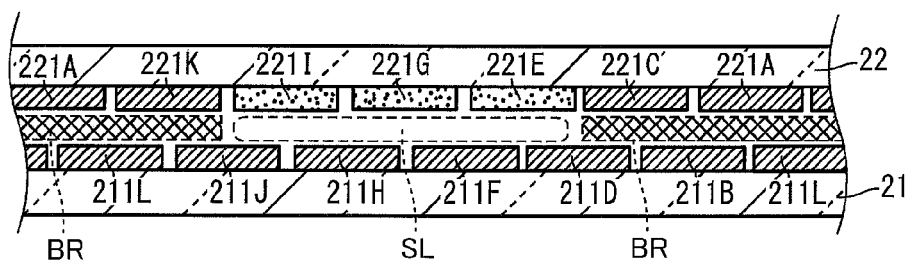
FIG. 17A is a cross-sectional view schematically illustrating one barrier light state of the switch liquid crystal panel in a tracking mode.
Figure 17B:
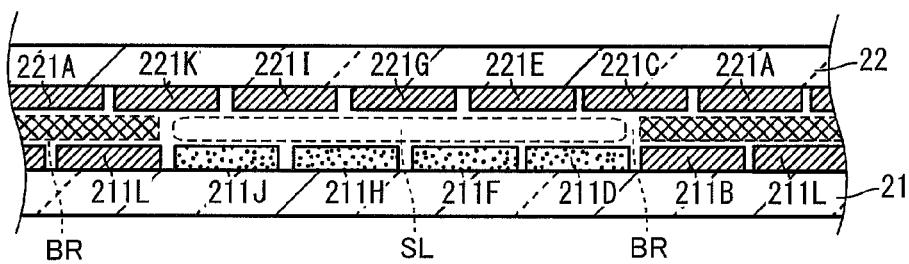
FIG. 17B is a cross-sectional view schematically illustrating one barrier light state of the switch liquid crystal panel in a calibration mode.

FIG. 17A is a cross-sectional view schematically illustrating one barrier light state of the switch liquid crystal panel 20 in the tracking mode. FIG. 17B is a cross-sectional view schematically illustrating one barrier light state of the switch liquid crystal panel 20 in the calibration mode. In the present embodiment, the width of the slit SL is set to a width corresponding to three electrodes in the tracking mode as illustrated in FIG. 17A, and is set to a width corresponding to four electrodes in the calibration mode, as illustrated in FIG. 17B.

Figure 18:
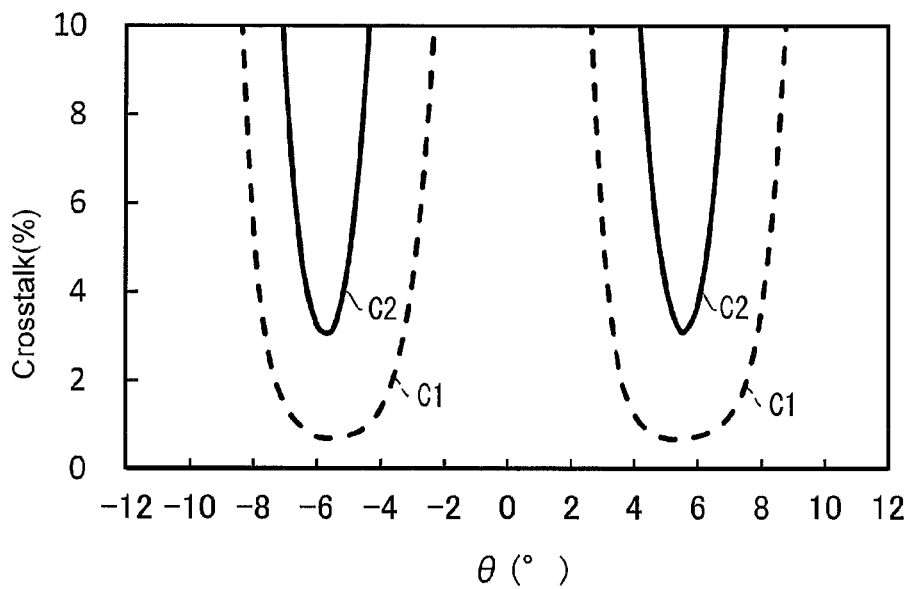
FIG. 18 is a graph illustrating crosstalk characteristics of the stereoscopic display device.

FIG. 18 is a graph illustrating crosstalk characteristics of the stereoscopic display device 1. In FIG. 18, the curve C1 indicates crosstalk characteristics in the tracking mod, and the curve C2 indicates crosstalk characteristics in the calibration mode. As illustrated in FIG. 18, the crosstalk characteristics in the calibration mode are steep, as compared with the crosstalk characteristics in the tracking mode.

This configuration allows the viewer 90 to easily identify the reference position of the parallax barrier. In other words, in a case where the crosstalk characteristics are flat, even if the center between the eyes of the viewer 90 is deviated more or less from the reference position of the parallax barrier, a relatively excellent stereoscopic image can be viewed. This rather makes it difficult for the viewer 90 to identify the reference position of the parallax barrier.

According to the present embodiment, in the calibration mode, the crosstalk characteristics are made steep purposely. In this configuration, the quality of a stereoscopic image degrades in the calibration mode, if the position of the viewer deviates from the reference position even slightly. This therefore makes it easier for the viewer 90 to identify the reference position of the parallax barrier.

Operation Example 1 in Calibration Mode

Figure 19A:
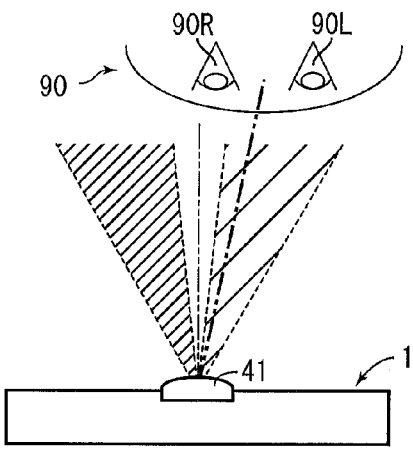
FIG. 19A is a view for explaining one exemplary operation in the calibration mode.
Figure 19B:
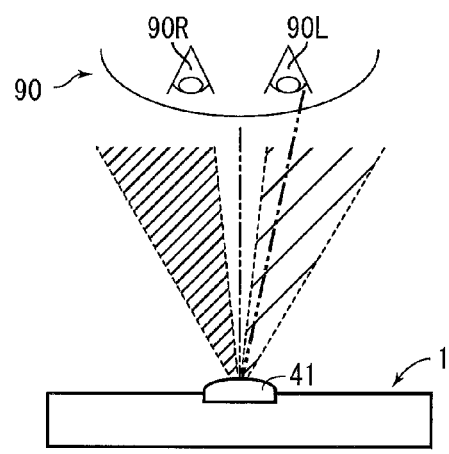
FIG. 19B is a view for explaining one exemplary operation in the calibration mode.
Figure 19C:
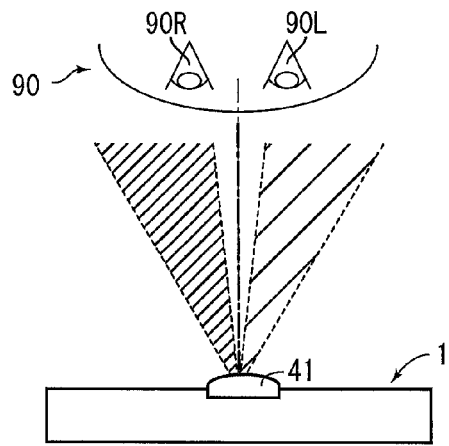
FIG. 19C is a view for explaining one exemplary operation in the calibration mode.

An exemplary operation in the calibration mode is described with reference to FIGS. 19A to 19C. In FIGS. 19A to 19C, the reference position of the parallax barrier (barrier center) is schematically indicated with a thin alternate long and two short dashed line, and the reference position of the position sensor 41 (camera center) is schematically indicted with a thick alternate long and two short dashed line.

FIG. 19A illustrates a state in which the reference position of the parallax barrier and the reference position of the position sensor 41 are deviated from each other. The viewer 90 observes the stereoscopic display device 1 at a set distance (optimal viewing distance). The viewer 90, at this position, moves the head, and looks for a place where the center between the eyes and the reference position of the parallax barrier coincide with each other, as illustrated in FIG. 19B. It should be noted that in the calibration mode, the stereoscopic display device 1 does not move the parallax barrier.

Figure 20A:
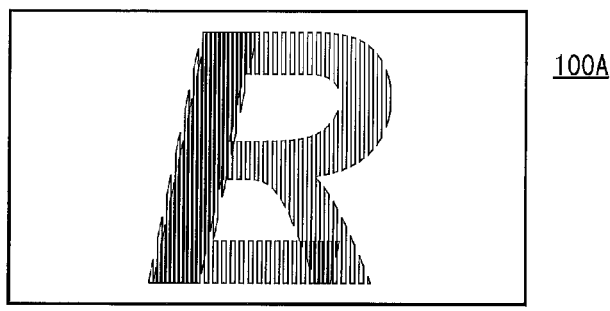
FIG. 20A is one exemplary reference image for calibration.
Figure 20B:
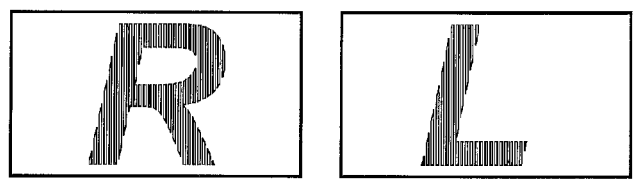
FIG. 20B is a view for explaining the reference image for calibration.
Figure 20B:
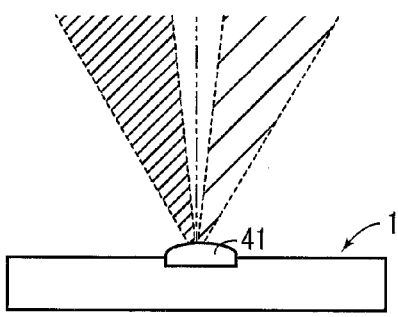
Figure 20C:
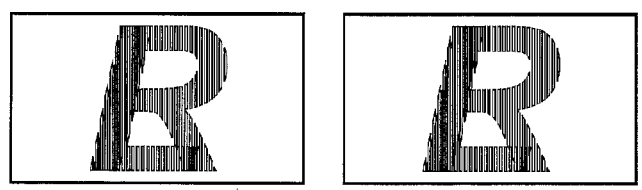
FIG. 20C is a view for explaining the reference image for calibration.
Figure 20C:
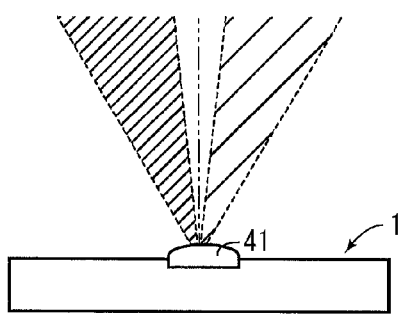

In the calibration mode, a reference image for calibration is displayed on the stereoscopic display device 1. FIG. 20A illustrates an image 100A that is an exemplary reference image for calibration. In the image 100A, the character "R" is displayed as a right-eye image, and the character "L" is displayed as a left-eye image. As illustrated in FIG. 20B, the position at which only the character "R" is visible to the right eye 90R, and only the character "L" is visible to the left eye 90L is a reference position of the parallax barrier. As illustrated in FIG. 20C, at a position deviated from the reference position of the parallax barrier, an image in which "R" and "L" are mixed is visible to both of the right eye 90R and the left eye 90L.

Figure 21A:
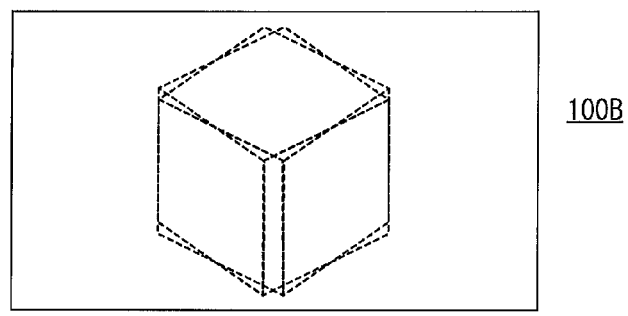
FIG. 21A is another exemplary reference image for calibration.
Figure 21B:
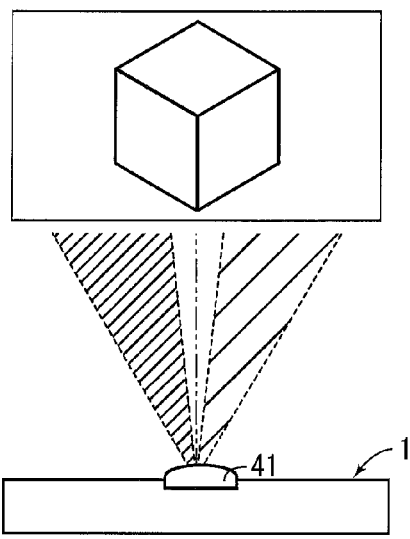
FIG. 21B is a view for explaining the reference image for calibration.
Figure 21C:
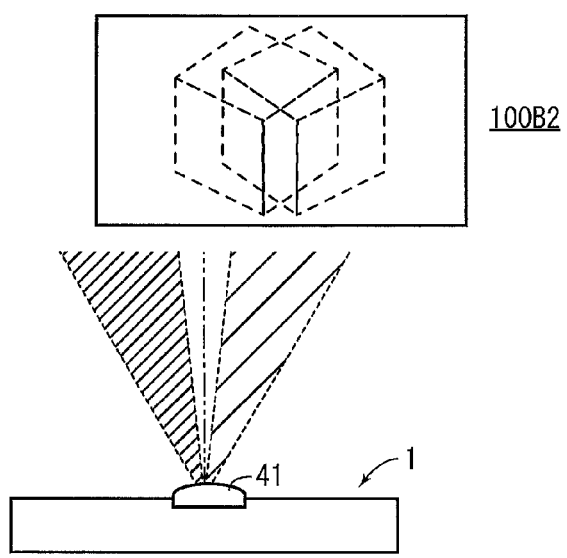
FIG. 21C is a view for explaining the reference image for calibration.

FIG. 21A illustrates an image 100B that is another exemplary reference image for calibration. In the image 100B, a stereoscopic image is displayed in which parallax is provided between a right-eye image and a left-eye image. When the stereoscopic display device 1 is viewed at the optimal viewing distance, a position at which no crosstalk occurs and a steric vision of the image 100B is obtained, as illustrated in FIG. 21B, is a reference position of the parallax barrier. As illustrated in FIG. 21C, when the image is viewed at a position deviated from the reference position of the parallax barrier, crosstalk occurs.

The stereoscopic display device 1 invites the viewer 90 to perform a specific operation with respect to the input device 45 (FIG. 2), in a place where the center between the both eyes and the reference position of the parallax barrier coincide with each other. To the calibration processing unit 48 (FIG. 2), the position coordinates of the viewer 90 are supplied via the position sensor 41 and the position computing unit 42 (FIG. 2). The calibration processing unit 48 causes the storage device 46 (FIG. 2) to store the position coordinates of the viewer 90 when a specific operation is performed with respect to the input device 45 as reference position information.

This provides a state in which the reference position of the parallax barrier and the reference position of the position sensor 41 coincide with each other, as illustrated in FIG. 19C.

As described above, according to the present embodiment, crosstalk characteristics in the calibration mode are made steep, as compared with the crosstalk characteristics in the tracking mode. This allows the viewer 90 to easily identify the reference position of the parallax barrier.

Further, according to the present embodiment, it is sufficient to identify the reference position of the parallax barrier in one barrier light state, and it is unnecessary to further identify the reference position in another barrier light state. Therefore, the load on the viewer 90 is reduced.

Operation Example 2 in Calibration Mode

Figure 22:
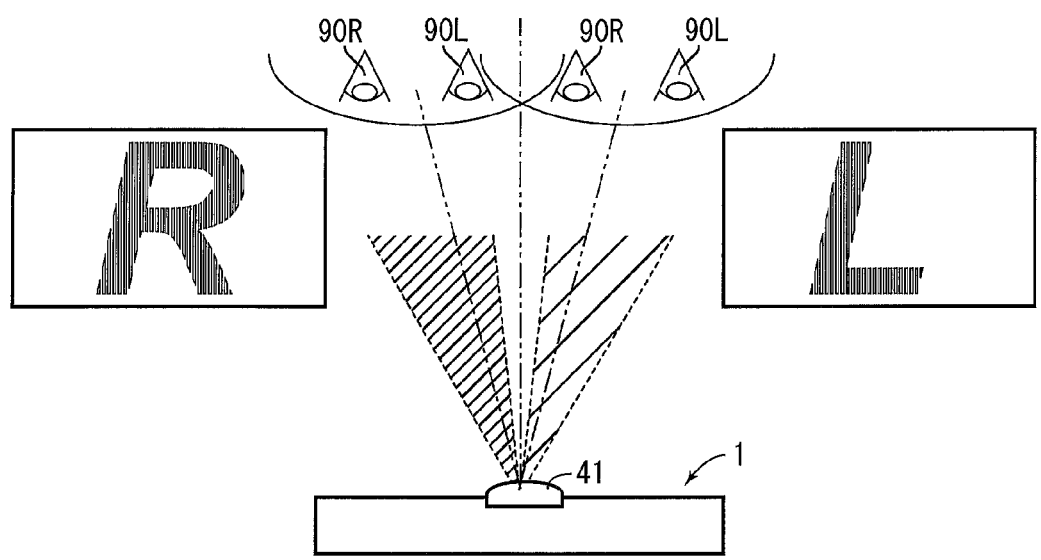
FIG. 22 is a view for explaining another exemplary operation in the calibration mode.

Next, with reference to FIG. 22, calibration of reference position information in a case where the optimal viewing distance to the stereoscopic display device 1 is unknown is described. On the stereoscopic display device 1, the image 100A (FIG. 20A) is displayed as a reference image for calibration. As illustrated in FIG. 22, in a case where the viewer 90 is not at the optimal viewing distance, the position at which the character "R" is visible to the right eye 90R, and the position at which the character "L" is visible to the left eye 90L are deviated from each other.

The stereoscopic display device 1 invites the viewer 90 to perform the specific operation with respect to the input device 45 (FIG. 2) at both of the positions, i.e., at the position where the character "R" is visible to the right eye 90R, and at the position where the character "L" is visible to the left eye 90L. The calibration processing unit 48 (FIG. 2) causes the storage device 46 (FIG. 2) to store the position coordinates of the viewer 90 when the specific operations are performed with respect to the input device 45.

The calibration processing unit 48 calculates intermediate position coordinates between the position coordinates at which the character "R" is visible to the right eye 90R, and the position coordinates at which the character "L" is visible to the left eye 90L, and causes the storage device 46 to store the calculated position coordinates as reference position information.

With the above-described operation, the reference position information can be calibrated, even in the case where the optimal viewing distance to the stereoscopic display device 1 is unknown. In this case as well, the crosstalk characteristics in the calibration mode are made steep, as compared with the crosstalk characteristics in the tracking mode. This allows the viewer 90 to easily identify the reference position of the parallax barrier. Besides, it is sufficient to identify the reference position of the parallax barrier in one barrier light state, and it is unnecessary to further identify the reference position in another barrier light state. Therefore, the load on the viewer 90 is reduced.

The foregoing description explains the stereoscopic display device 1 according to Embodiment 1 of the present invention. The stereoscopic display device 1 sets the width of the slit to a width corresponding to three electrodes in the tracking mode, and to a width corresponding to four electrodes in the calibration mode. The combination of the widths of the slit, however, is not limited to this. The same effect as that in the present embodiment can be achieved as long as the slit width in the calibration mode is greater than the slit width in the tracking mode.

Embodiment 2

The stereoscopic display device according to Embodiment 2 of the present invention, and the stereoscopic display device 1, are similar to each other, except for only the operation in the calibration mode. In the present embodiment, the slit width in the calibration mode is set smaller than the slit width Wsl in the tracking mode.

Figure 23A:
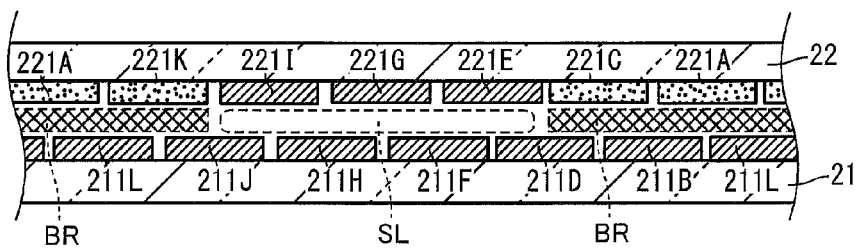
FIG. 23A is a cross-sectional view schematically illustrating one barrier light state of the switch liquid crystal panel in the tracking mode.
Figure 23B:
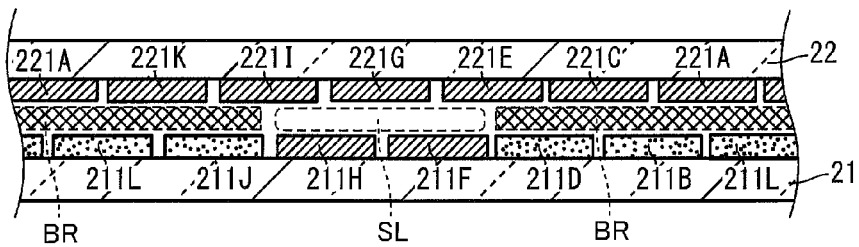
FIG. 23B is a cross-sectional view schematically illustrating one barrier light state of the switch liquid crystal panel in one example of the calibration mode.
Figure 23C:
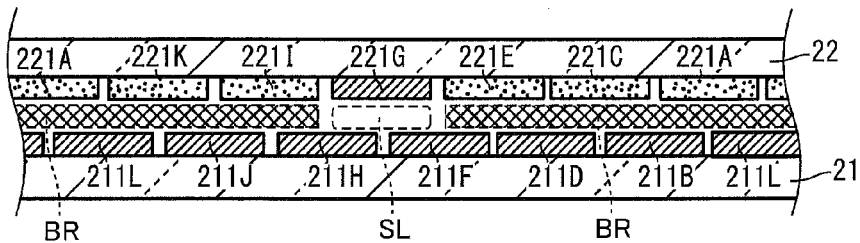
FIG. 23C is a cross-sectional view schematically illustrating one barrier light state of the switch liquid crystal panel in another example of the calibration mode.

FIG. 23A is a cross-sectional view schematically illustrating one barrier light state of the switch liquid crystal panel 20 in the tracking mode. FIG. 23B is a cross-sectional view schematically illustrating one barrier light state of the switch liquid crystal panel 20 in one example of the calibration mode. FIG. 23C is a cross-sectional view schematically illustrating one barrier light state of the switch liquid crystal panel 20 in another example of the calibration mode. In the present embodiment, in the tracking mode, the width of the slit SL is set to a width corresponding to three electrodes, as illustrated in FIG. 23A. On the other hand, in the calibration mode, the width of the slit SL is set to a width corresponding to two electrodes as illustrated in FIG. 23B, or alternatively, to a width corresponding to one electrode as illustrated in FIG. 23C.

Figure 24:
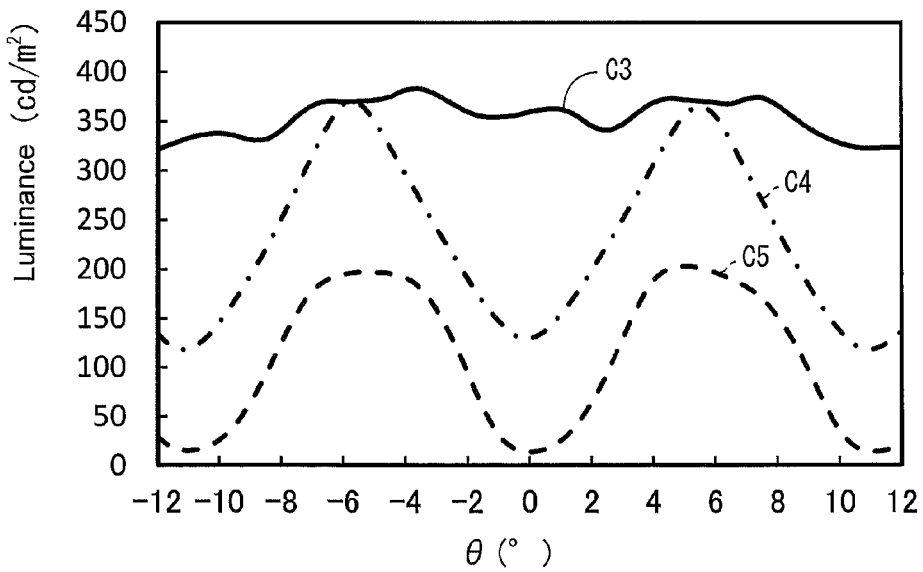
FIG. 24 is a graph illustrating luminance characteristics of the stereoscopic display device.

FIG. 24 is a graph illustrating luminance characteristics of the stereoscopic display device according to the present embodiment. In FIG. 24, the curve C3 indicates luminance characteristics in the tracking mode, that is, luminance characteristics in the case where the width of the slit SL is set to a width corresponding to three electrodes. The curve C4 and the curve C5 indicate luminance characteristics in the calibration mode; the curve C4 indicates luminance characteristics in a case where the width of the slit SL is set to a width corresponding to two electrodes, and the curve C5 indicates luminance characteristics in a case where the width of the slit SL is set to the width corresponding to one electrode. As illustrated in FIG. 24, the luminance characteristics in the calibration mode are steep, as compared with the crosstalk characteristics in the tracking mode.

Figure 25A:
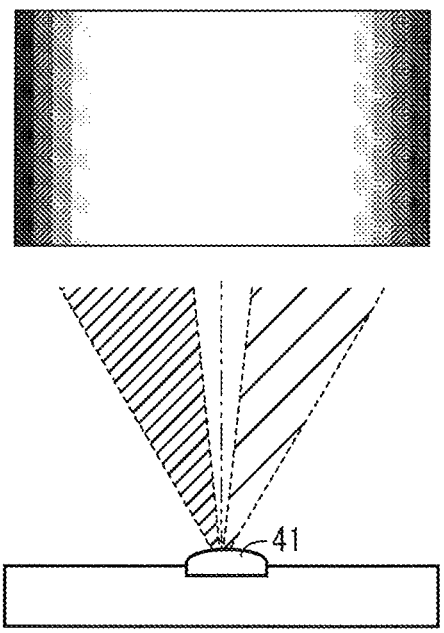
FIG. 25A is a view for explaining one exemplary operation in the calibration mode.
Figure 25B:
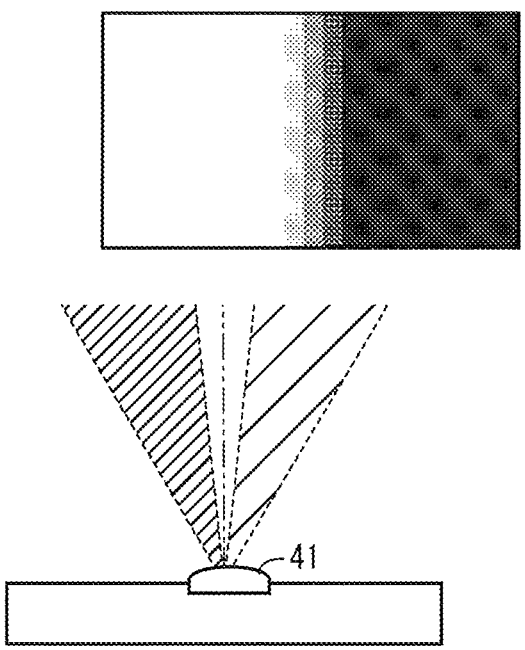
FIG. 25B is a view for explaining one exemplary operation in the calibration mode.

In the present embodiment, an image having uniform brightness is displayed as the reference image for calibration. The viewer views this image at a position farther than a position at the optimal viewing distance to the stereoscopic display device. As illustrated in FIG. 25A, a position at which areas having low luminances are equally visible on both sides of the screen is a reference position of the parallax barrier. On the other hand, if the position is deviated from the reference position of the parallax barrier, areas having low luminance become unevenly provided, as illustrated in FIG. 25B.

As is the case with Embodiment 1, the stereoscopic display device invites the viewer to perform a specific operation with respect to the input device 45 (FIG. 2), in a place where the center between the both eyes and the reference position of the parallax barrier coincide with each other. To the calibration processing unit 48 (FIG. 2), the position coordinates of the viewer are supplied via the position sensor 41 and the position computing unit 42 (FIG. 2). The calibration processing unit 48 causes the storage device 46 (FIG. 2) to store the position coordinates of the viewer when a specific operation is performed with respect to the input device 45 as reference position information.

In the present embodiment, in the calibration mode, the luminance characteristics are made steep purposely, so that the viewer is allowed to easily recognize the luminance contrast. This allows the viewer to identify the reference position of the parallax barrier easily.

The foregoing description explains the stereoscopic display device according to Embodiment 2 of the present invention. The stereoscopic display device according to the present embodiment sets the width of the slit to a width corresponding to three electrodes in the tracking mode, and to a width corresponding to two or one electrode in the calibration mode. The combination of the widths of the slit, however, is not limited to this. The same effect as that in the present embodiment can be achieved as long as the slit width in the calibration mode is smaller than the slit width in the tracking mode.

Embodiment 3

Figure 26:
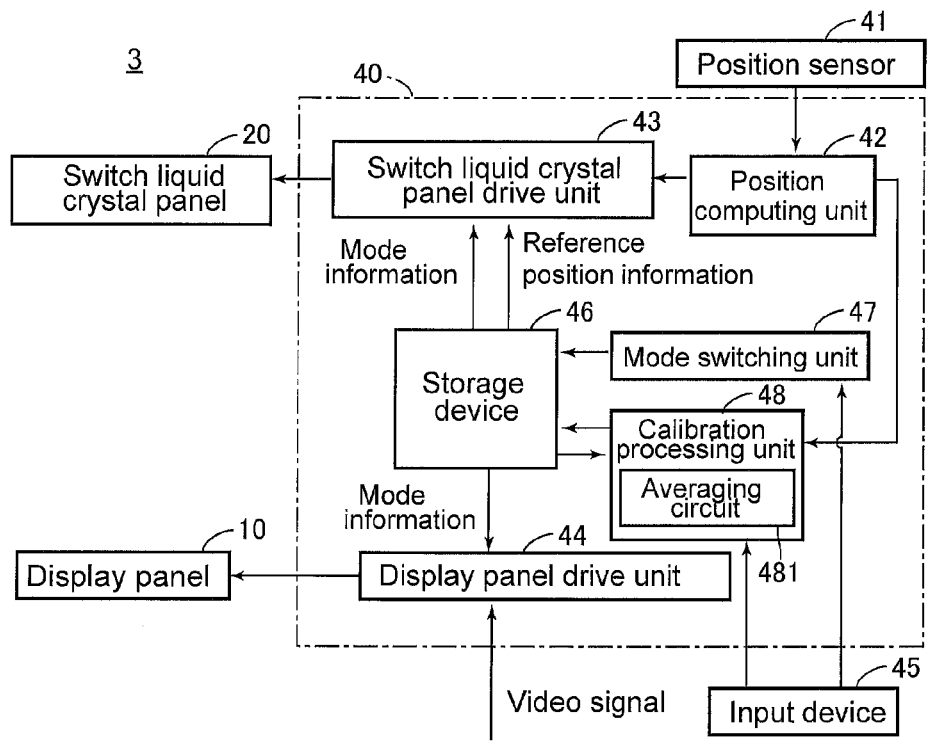
FIG. 26 is a block diagram illustrating a functional configuration of the stereoscopic display device according to Embodiment 3 of the present invention.

FIG. 26 is a functional block diagram illustrating a functional configuration of the stereoscopic display device 3 according to Embodiment 3 of the present invention. The stereoscopic display device 3 is similar to the stereoscopic display device 1, except for only the configuration of the calibration processing unit 48. The calibration processing unit 48 of the stereoscopic display device 3 includes an averaging circuit 481.

In the present embodiment as well, the stereoscopic display device 3 invites the viewer to perform a specific operation with respect to the input device 45, in a place where the center between the both eyes and the reference position of the parallax barrier coincide with each other. To the calibration processing unit 48, the position coordinates of the viewer are supplied via the position sensor 41 and the position computing unit 42.

In the present embodiment, the stereoscopic display device 3 invites the viewer to perform the above-described operation a plurality of times. The calibration processing unit 48 causes the storage device 46 to store the position coordinates of the viewer in each operation. The averaging circuit 481 averages a plurality of sets of position coordinates stored in the storage device 46. The calibration processing unit 48 causes the storage device 46 to store the position coordinates averaged by the averaging circuit 481 as the reference position information.

According to the present embodiment, the identification of the reference position of the parallax barrier is performed twice or more times, and the reference position is calculated based on the average value. This improves the calibration accuracy.

Embodiment 4

The stereoscopic display device according to Embodiment 4 of the present invention is similar to the stereoscopic display device 1, except for only the operation in the calibration mode. In the present embodiment, as is the case with the stereoscopic display device according to Embodiment 2, the slit width in the calibration mode is set smaller than the slit width Wsl in the tracking mode.

Figure 27A:
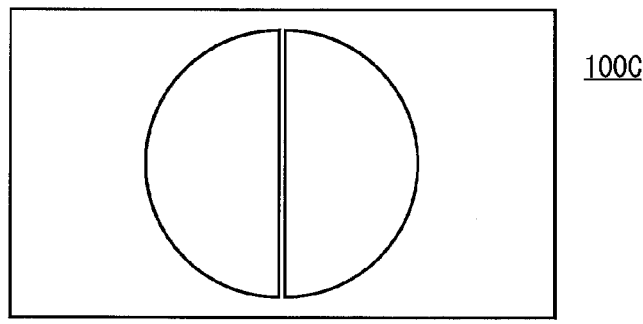
FIG. 27A illustrates an exemplary reference image for calibration used in Embodiment 4 of the present invention.
Figure 27B:
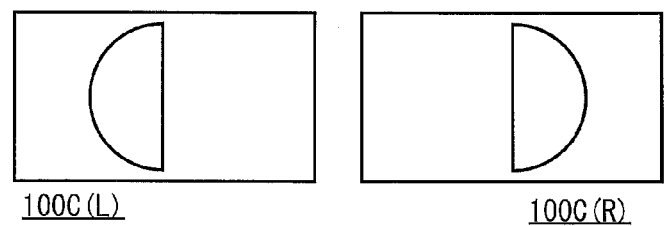
FIG. 27B is a view for explaining the reference image for calibration.

FIG. 27A illustrates an image 100C, which is an exemplary reference image for calibration used in the present embodiment. The image 100C is composed of a left-eye image 100C(L) and a right-eye image 100C(R). As illustrated in FIG. 27B, a left half of a circle is displayed as the left-eye image 100C(L), and a right half of a circle is displayed as the right-eye image 100C(R).

Figure 28:
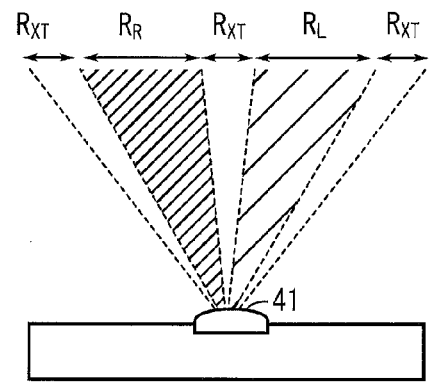
FIG. 28 is a view for explaining principles of calibration according to Embodiment 4 of the present invention.

FIG. 28 is a view for explaining principles of calibration according to the present embodiment. As described above, the right-eye image and the left-eye image are separated in the horizontal direction by the switch liquid crystal panel 20. In a case where the parallax barrier is fixed, as illustrated in FIG. 28, a right image area $R_R$ in which the right-eye image 100C(R) is visible, a left image area $R_L$ in which the left-eye image 100C(L) is visible, and a crosstalk area $R_{XT}$, appear alternately in the horizontal direction.

Figure 29A:
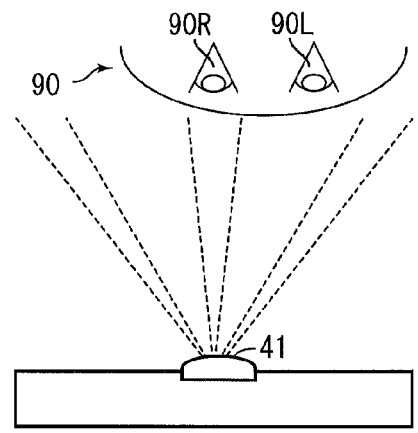
FIG. 29A schematically illustrates a case where the right eye of a viewer is in a crosstalk area and the left eye is in a left image area.

FIG. 29A schematically illustrates a case where the right eye 90R of the viewer 90 is in the crosstalk area $R_{XT}$, and the left eye 90L thereof is in the left image area $R_L$. In this case, the left-eye image 100C(L) is visible to the viewer 90 with more brightness than the right-eye image 100C(R). In other words, in the image 100C (FIG. 27A), the left half of the circle appears bright, and the right half of the same appears dark.

Figure 29B:
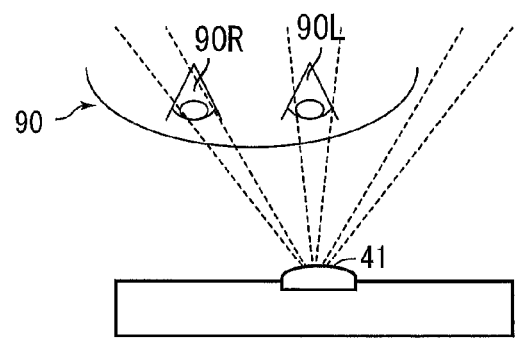
FIG. 29B schematically illustrates one of cases where both of the right eye and the left eye of a viewer are in the crosstalk area.
Figure 29C:
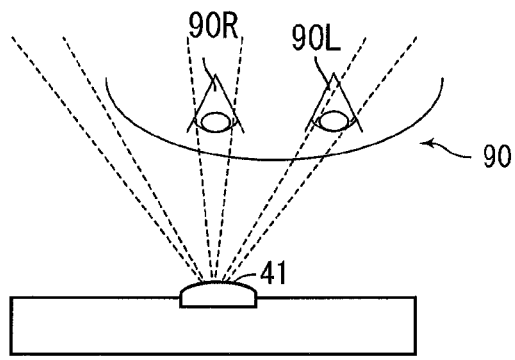
FIG. 29C schematically illustrates another one of cases where both of the right eye and the left eye of a viewer are in the crosstalk area.

FIGS. 29B and 29C schematically illustrate a case where both of the right eye 90R and the left eye 90L of the viewer 90 are in the crosstalk area $R_{XT}$. In this case, the right-eye image 100C(R) and the left-eye image 100C(L) are visible to the viewer with the same brightness. In other words, in the image 100C (FIG. 27A), the left half and the right half of the circle appear with the same brightness.

The stereoscopic display device according to the present embodiment invites the viewer 90 to perform a specific operation with respect to the input device, at both of the following positions: the position on the right side to the center of the stereoscopic display device, at which the right and left halves of the circle appear with the same brightness (FIG. 29B); and the position on the left side to the center of the stereoscopic display device, at which the right and left halves of the circle appear with the same brightness (FIG. 29C). The calibration processing unit causes the storage device to store the position coordinates of the viewer 90 when the specific operation is performed with respect to the input device.

The calibration processing unit calculates coordinates of an intermediate position between the position coordinates of the viewer 90 in FIG. 29B and the position coordinates of the viewer 90 in FIG. 29C, and causes the storage device to store the calculated position coordinates as reference position information.

In other words, in the present embodiment, by using the crosstalk area $R_{XT}$, the reference position of the parallax barrier is identified.

In the present embodiment, the slit width in the calibration mode is made smaller than the slit width Wsl in the tracking mode. More specifically, as is the case with Embodiment 2, the width of the slit SL is set to a width corresponding to three electrodes in the tracking mode, and the width of the slit SL is set to a width corresponding to two or one electrode in the calibration mode.

Figure 30A:
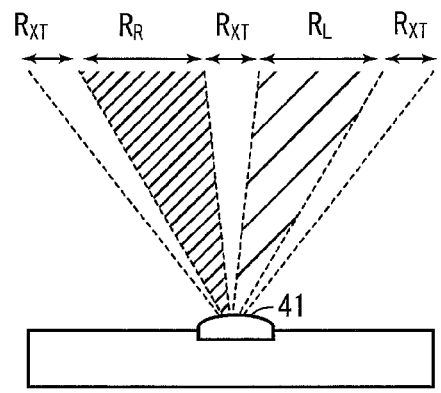
FIG. 30A schematically illustrates a right image area, a left image area, and a crosstalk area in the tracking mode.
Figure 30B:
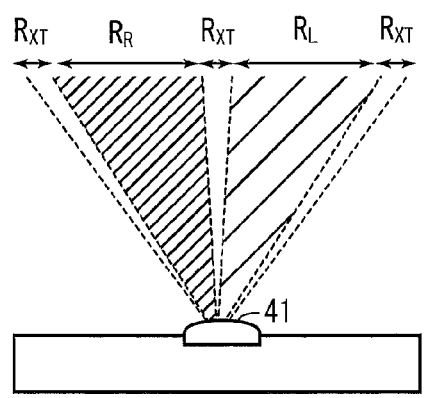
FIG. 30B schematically illustrates a right image area, a left image area, and a crosstalk area in the calibration mode.

FIG. 30A schematically illustrates the right image area $R_R$, the left image area $R_L$, and the crosstalk area $R_{XT}$ in the tracking mode. FIG. 30B schematically illustrates the right image area $R_R$, the left image area $R_L$, and the crosstalk area $R_{XT}$ in the calibration mode.

As described above, as the slit width is smaller, crosstalk is low in larger areas. In other words, as the slit width is smaller, the crosstalk area $R_{XT}$ is smaller. Therefore, in the calibration mode, the crosstalk area $R_{XT}$ is smaller as compared with that in the tracking mode. This makes it possible to more accurately identify the reference position of the parallax barrier.

In the present embodiment as well, it is sufficient to identify the reference position of the parallax barrier in one barrier light state, and it is unnecessary to further identify the reference position in another barrier light state. Further, even in a case where the optimal viewing distance to the stereoscopic display device is unknown, the reference position information can be calibrated.

The foregoing description explains the stereoscopic display device according to Embodiment 4 of the present invention. The stereoscopic display device according to the present embodiment sets the width of the slit to a width corresponding to three electrodes in the tracking mode, and to a width corresponding to two or one electrode in the calibration mode. The combination of the widths of the slit, however, is not limited to this. The same effect as that in the present embodiment can be achieved as long as the slit width in the calibration mode is smaller than the slit width in the tracking mode.

Other Embodiments

The foregoing description describes embodiments of the present invention, but the present invention is not limited to the embodiments described above, and may be varied in many ways within the scope of the invention. Further, the embodiments can be carried out in combination appropriately.

In the foregoing description of each embodiment mentioned above, the case where electrodes of 12 systems in total are formed on the first substrate 21 and the second substrate 22 of the switch liquid crystal panel 20 is described. However, the number of electrodes formed on the switch liquid crystal panel 20 is arbitrary.

In the foregoing description of the embodiments, the case where pattern electrodes are formed on both of the first and second substrates 21 and 22 of the switch liquid crystal panel 20, and the electrodes formed on the first electrode 21 and the electrodes formed on the second substrate 22 are arranged with a deviation of half of the pitch, is described. This configuration is merely an example, and the switch liquid crystal panel 20 may have an arbitrary configuration. For example, the configuration of the switch liquid crystal panel 20 may be as follows: pattern electrodes are formed on the first substrate 21, and a common electrode is formed over a substantially entire surface of the second substrate 22.

In the descriptions of the embodiments mentioned above, an example is described in which the display panel 10 and the switch liquid crystal panel 20 are stacked so that the switch liquid crystal panel 20 is positioned on the viewer 90 side. The display panel 10 and the switch liquid crystal panel 20, however, may be stacked so that the display panel 10 is positioned on the viewer 90 side.

In the configuration in which the display panel 10 is arranged on the viewer side, light separated by the switch liquid crystal panel 20 passes through the display panel 10. In this configuration, light separated by the switch liquid crystal panel 20 is scattered or diffracted by the display panel 10. This causes the angle-dependent variation of the luminance to be more gradual. On the other hand, in a configuration in which the switch liquid crystal panel 20 is arranged on the viewer side, light from the display panel 10 is separated by the switch liquid crystal panel 20. This configuration exhibits excellent separation properties, as compared with the case where the display panel 10 is arranged on the viewer side.

In the embodiments mentioned above, examples are described in which a liquid crystal display panel is used as the display panel 10. However, an organic EL (electroluminescence) panel, a MEMS (micro electric mechanical system) panel, or a plasma display panel may be used in the place of the liquid crystal display panel.

INDUSTRIAL APPLICABILITY

The present invention is industrially applicable as a stereoscopic display device.

The invention claimed is:

1. A stereoscopic display device comprising:
a display panel for displaying an image;
a switch liquid crystal panel that is arranged so as to be stacked on the display panel;
a position sensor for acquiring position information of a viewer; and
a control unit configured to cause the switch liquid crystal panel to display a parallax barrier in which transmitting regions and non-transmitting regions are formed in periodic fashion in a predetermined alignment direction,
wherein the control unit has, as operation modes, at least a tracking mode in which, according to the position information, the parallax barrier is moved in the alignment direction and is displayed on the switch liquid crystal panel, and a calibration mode for calibration of a reference position of the position information, and the control unit sets a width of the transmitting region of the parallax barrier in the tracking mode, and a width of the transmitting region of the parallax barrier in the calibration mode, so that these widths are different from each other.

2. The stereoscopic display device according to claim 1, further comprising:
an input device that receives an operation from the viewer,
wherein the control unit includes a calibration processing unit that calibrates the reference position of the position information, based on the position information when a specific operation is performed with respect to the input device in the calibration mode.

3. The stereoscopic display device according to claim 2, wherein the control unit further includes a storage device, and
the calibration processing unit causes the storage device to store the position information when the specific operation is performed with respect to the input device in the calibration mode, and calibrates the reference position based on two or more pieces of position information including the position information stored by the storage device.

4. The stereoscopic display device according to claim 3, wherein the calibration processing unit includes an averaging circuit that averages the two or more pieces of position information including the position information stored by the storage device.

5. The stereoscopic display device according to claim 1, wherein the control unit sets the width of the transmitting region of the parallax barrier in the calibration mode to a width greater than the width of the transmitting region of the parallax barrier in the tracking mode.

6. The stereoscopic display device according to claim 1, wherein the control unit sets the width of the transmitting region of the parallax barrier in the calibration mode to a width smaller than the width of the transmitting region of the parallax barrier in the tracking mode.

7. The stereoscopic display device according to claim 1, wherein the control unit make the width of the transmitting region and the width of the non-transmitting region equal to each other in the tracking mode.

8. The stereoscopic display device according to claim 1, wherein the switch liquid crystal panel includes:
a liquid crystal layer;
a first substrate and a second substrate that face each other with the liquid crystal layer being interposed therebetween;
a first electrode group that includes a plurality of electrodes that are arranged in the alignment direction at a predetermined interval on the first substrate; and
a second electrode group that includes a plurality of electrodes that are arranged in the alignment direction at a predetermined interval on the second substrate,
wherein the first electrode group and the second electrode group are arranged so as to be deviated with respect to each other by half of the predetermined interval in the alignment direction.

9. The stereoscopic display device according to claim 1, wherein the display panel is a liquid crystal display panel.

* * * * *